US011300807B2

(12) United States Patent
Kakeya et al.

(10) Patent No.: US 11,300,807 B2
(45) Date of Patent: Apr. 12, 2022

(54) IMAGE DISPLAY DEVICE, IMAGE DISPLAY METHOD, AND IMAGE DISPLAY SYSTEM

(71) Applicant: University of Tsukuba, Ibaraki (JP)

(72) Inventors: Hideki Kakeya, Ibaraki (JP); Ayuki Hayashishita, Ibaraki (JP)

(73) Assignee: University of Tsukuba, Ibaraki (JP)

( * ) Notice: Subject to any disclaimer, the term of this patent is extended or adjusted under 35 U.S.C. 154(b) by 0 days.

(21) Appl. No.: 16/769,493

(22) PCT Filed: Dec. 5, 2018

(86) PCT No.: PCT/JP2018/044773
§ 371 (c)(1),
(2) Date: Jun. 3, 2020

(87) PCT Pub. No.: WO2019/111964
PCT Pub. Date: Jun. 13, 2019

(65) Prior Publication Data
US 2020/0387005 A1  Dec. 10, 2020

(30) Foreign Application Priority Data
Dec. 5, 2017 (JP) .............................. JP2017-233744

(51) Int. Cl.
*G02B 30/31* (2020.01)
*H04N 13/324* (2018.01)
(Continued)

(52) U.S. Cl.
CPC ............. *G02B 30/31* (2020.01); *G02B 30/22* (2020.01); *G02B 30/32* (2020.01); *H04N 13/317* (2018.05);
(Continued)

(58) Field of Classification Search
None
See application file for complete search history.

(56) References Cited

U.S. PATENT DOCUMENTS

| 6,094,216 A | * | 7/2000 | Taniguchi | G09G 3/003 348/51 |
| 2010/0260418 A1 | * | 10/2010 | Tsai | H04N 13/161 382/166 |

(Continued)

FOREIGN PATENT DOCUMENTS

| JP | 2012088505 A | 5/2012 |
| JP | 2013117586 A * | 6/2013 ............ G02B 30/31 |

(Continued)

OTHER PUBLICATIONS

"International Application Serial No. PCT/JP2018/044/73, Article 34 Amendments filed Apr. 26, 19", w/ English claims, (Apr. 26, 2019), 15 pgs.

(Continued)

*Primary Examiner* — Reza Aghevli
(74) *Attorney, Agent, or Firm* — Schwegman Lundberg & Woessner, P.A.

(57) ABSTRACT

An image display device acquires positional information including a distance between at least one eye of an observer and an image display surface, and corrects, based on the acquired positional information, a relative positional relationship between slit areas and an image displayed on the image display surface, by using a width smaller than the width of one subpixel as a minimum correction unit.

8 Claims, 11 Drawing Sheets

(51) Int. Cl.
  *H04N 13/317* (2018.01)
  *H04N 13/351* (2018.01)
  *G02B 30/32* (2020.01)
  *G02B 30/22* (2020.01)

(52) U.S. Cl.
  CPC ......... *H04N 13/324* (2018.05); *H04N 13/351* (2018.05)

(56) References Cited

U.S. PATENT DOCUMENTS

| | | | | |
|---|---|---|---|---|
| 2012/0092468 A1* | 4/2012 | Okamoto | ............. | H04N 13/317 348/55 |
| 2012/0092470 A1* | 4/2012 | Okamoto | ............. | H04N 13/317 348/60 |
| 2012/0105767 A1* | 5/2012 | Choi | ................... | G02B 6/0038 349/62 |
| 2012/0147156 A1* | 6/2012 | Aizawa | ................ | H04N 13/122 348/51 |
| 2013/0033488 A1* | 2/2013 | Takahashi | ............. | H04N 13/32 345/419 |
| 2013/0033583 A1* | 2/2013 | Lee | .................... | H04N 21/4318 348/47 |
| 2013/0065682 A1* | 3/2013 | Izuno | ................... | A63F 13/428 463/31 |
| 2013/0076618 A1* | 3/2013 | Miyamoto | ........... | H04N 13/128 345/156 |
| 2013/0083169 A1* | 4/2013 | Higuchi | ................ | H04N 13/25 348/47 |
| 2013/0163078 A1* | 6/2013 | Saito | .................... | H04N 13/302 359/466 |
| 2013/0229710 A1* | 9/2013 | Watanabe | ............ | H04N 13/305 359/462 |
| 2014/0035902 A1* | 2/2014 | An | ....................... | H04N 13/128 345/419 |
| 2014/0063213 A1* | 3/2014 | Tsuchihashi | ......... | H04N 13/305 348/59 |
| 2014/0078194 A1* | 3/2014 | An | ....................... | H04N 13/302 345/691 |
| 2014/0313298 A1* | 10/2014 | Usukura | .............. | H04N 13/324 348/59 |
| 2014/0340486 A1* | 11/2014 | Asano | ....................... | G06T 7/97 348/47 |
| 2015/0362740 A1* | 12/2015 | Hamagishi | ............. | G02B 30/27 348/44 |
| 2016/0059128 A1* | 3/2016 | Ito | .......................... | A63F 13/52 463/32 |
| 2016/0155405 A1* | 6/2016 | Kim | ..................... | G09G 3/2011 345/213 |
| 2016/0373716 A1* | 12/2016 | Lu | ........................ | H04N 13/122 |
| 2018/0335662 A1* | 11/2018 | Iwase | .................. | H04N 13/305 |

FOREIGN PATENT DOCUMENTS

| | | |
|---|---|---|
| JP | 2013117586 A | 6/2013 |
| JP | 2013134279 A | 7/2013 |
| JP | 2014045466 A | 3/2014 |
| JP | 2015125407 A | 7/2015 |

OTHER PUBLICATIONS

"International Application Serial No. PCT/JP2018/044773, International Search Report dated Feb. 19, 2019", (Feb. 19, 2019), 2 pgs.
"International Application Serial No. PCT/JP2018/044773, Written Opinion dated Feb. 19, 2019", (Feb. 19, 2019), 5 pgs.
Kakeya, H., et al., "Parallax barrier based autostereoscopicdisplay with a deep viewing zone", Proc. IDW, 3DSA3/3D3-2, (2016), pp. 1529-1532.

* cited by examiner

IMAGE DISPLAY DEVICE, IMAGE DISPLAY METHOD, AND IMAGE DISPLAY SYSTEM

PRIORITY APPLICATIONS

This application is a U.S. National Stage Filing under 35 U.S.C. 371 from International Application No. PCT/JP2018/044773, filed on Dec. 5, 2018, and published as WO2019/111964 on Jun. 13, 2019, which claims the benefit of priority to Japanese Application No. 2017-233744, filed on Dec. 5, 2017; the benefit of priority of each of which is hereby, claimed herein, and which applications and publication are hereby incorporated herein by reference in their entirety.

TECHNICAL FIELD

The present invention relates to an image display device, an image display method, and an image display system.

BACKGROUND ART

Research and development have been conducted about image display devices that allow images to be viewed in a stereoscopic manner.

In this regard, a time-division parallax barrier autostereoscopic video display device is known that is a parallax-barrier autostereoscopic video display device and sequentially presents a plurality of stereoscopic display images that are fused together, in the right and left eyes of an observer observing a predetermined line-of-sight direction such that the images are presented in a predetermined order according to a time series with a period of 4 or more, the autostereoscopic video display device including an image display means including a backlight and an image display panel for displaying the plurality of stereoscopic display images and a diffuser provided between the backlight and the image display panel and having directivity in a direction with a predetermined polar angle with polar coordinates, and a display control means for controlling the image display panel, wherein the display control means performs control such that an array including iterative time series units periodically arranged are changed according to the time series, the time series for the right eye and the time series for the left eye each are time series that has a phase shift with each other and that has the same period, the image display means includes an arrangement sequence including iterative array units and periodically arranged rightward or leftward, the array units have an elongated and striped shape, and the arrangement sequence as sequentially viewed rightward or leftward by an observer matches the time series (see Patent Literature 1).

CITATION LIST

Patent Literature

Patent Literature 1: JP 2015-125407 A

SUMMARY OF INVENTION

Technical Problem

Here, such an autostereoscopic video display device sequentially presents a plurality of stereoscopic display images in a predetermined order according to a predetermined time series with a predetermined period, and thus crosstalk is less likely to occur. However, there is a problem in that brightness of a stereoscopic display image displayed on an image display panel is lower than desired brightness. On the other hand, in the autostereoscopic video display device that sequentially presents the plurality of stereoscopic display images in the predetermined order according to the predetermined time series with the predetermined period, the brightness of the stereoscopic display images displayed on the image display panel can be prevented from being lower than the desired brightness, but there is a problem in that crosstalk is likely to occur.

Thus, in view of the problems of the known technologies described above, an object of the present invention is to provide an image display device, an image display method, and an image display system that can suppress image interference between a left eye and a right eye and improve a ratio between display luminance and power.

Solution to Problem (1) An image display device according to an aspect of the present invention is an image display device for displaying a stereoscopic image based on a parallax barrier scheme using time-division, the image display device including: a plurality of display elements arranged in a matrix on an image display surface of a transmissive type; a plurality of illumination arrangement control elements arranged in a matrix on an illumination arrangement control surface configured to variably control arrangement, on the image display surface, of illumination light emitted from a back surface of the image display surface to the image display surface; and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, wherein each of the plurality of illumination arrangement control elements on the illumination arrangement control surface is controlled by using a subpixel as a minimum control unit, and the controller is configured to control an arrangement pattern for left image areas of the image display surface in which an image of the left eye image data is displayed and an arrangement pattern for right image areas of the image display surface in which an image of the right eye image data is displayed, respectively, control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and acquire positional information including a distance between at least one eye of the observer and the image display surface and corrects, based on the positional information acquired, a relative positional relationship between the slit areas and the image displayed on the image display surface, by using a width larger than 0 and smaller than a width of one subpixel as a minimum correction unit.

(2) In the image display device according to (1) described above, the image display device may be configured with a number of divisions in the time-division being smaller than four.

(3) In the image display device according to (1) or (2) described above, the image display device may be configured such that the slit areas have inclination angle of larger than 0 and smaller than tan−1 (⅓) with respect to an upward/downward direction along the illumination arrangement control surface.

(4) In the image display device according to any one of (1) to (3) described above, each of the plurality of display elements includes a red subpixel, a green subpixel, and a blue subpixel, each of the plurality of illumination arrangement control elements include a red subpixel, a green subpixel, and a blue subpixel, and the plurality of display elements on the image display surface and the plurality of illumination arrangement control elements on the illumination arrangement control surface are arranged such that a sequence of the red subpixel, the green subpixel, and the blue subpixel on the image display surface is the reverse of a sequence of the red subpixel, the green subpixel, and the blue subpixel on the illumination arrangement control surface.

(5) In the image display device according to any one of (1) to (4) described above, the image display device may be configured such that information indicating brightness of ambient light is acquired, and the number of divisions in the time-division is changed in accordance with the brightness indicated by the acquired information.

(6) An image display method according to an aspect of the present invention is an image display method for an image display device for displaying a stereoscopic image based on a parallax barrier scheme using time-division, the image display device including a plurality of display elements arranged in a matrix on an image display surface of a transmissive type, a plurality of illumination arrangement control elements arranged in a matrix on an illumination arrangement control surface configured to variably control arrangement, on the image display surface, of illumination light emitted from a back surface of the image display surface to the image display surface, and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, each of the plurality of illumination arrangement control elements on the illumination arrangement control surface being controlled by using a subpixel as a minimum control unit, the image display method including: controlling an arrangement pattern for left image areas of the image display surface in which an image of the left eye image data is displayed and an arrangement pattern for right image areas of the image display surface in which an image of the right eye image data is displayed, respectively; controlling the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively; and acquiring positional information including a distance between at least one eye of the observer and the image display surface and correcting, based on the positional information acquired, a relative positional relationship between the slit areas and the image displayed on the image display surface, by using a width larger than 0 and smaller than a width of one subpixel as a minimum correction unit.

(7) An image display system according to an aspect of the present invention is an image display system including: an image display device configured to display a stereoscopic image based on a parallax barrier scheme using time-division; and a distance detection unit, wherein the image display device includes: a plurality of display elements arranged in a matrix on an image display surface of a transmissive type; a plurality of illumination arrangement control elements arranged in a matrix on an illumination arrangement control surface configured to variably control arrangement, on the image display surface, of illumination light emitted from a back surface of the image display surface to the image display surface; and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, each of the plurality of illumination arrangement control elements on the illumination arrangement control surface is controlled by using a subpixel as a minimum control unit, the distance detection unit detects distance information indicating a distance between at least one eye of the observer and the image display surface, and the controller is configured to control an arrangement pattern for left image areas of the image display surface in which an image of the left eye image data is displayed and an arrangement pattern for right image areas of the image display surface in which an image of the right eye image data is displayed, respectively, control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and acquire positional information including the distance between at least one eye of the observer and the image display surface and corrects, based on the positional information acquired, a relative positional relationship between the slit areas and the image displayed on the image display surface, by using a width larger than 0 and smaller than a width of one subpixel as a minimum correction unit.

(8) An image display device according to an aspect of the present invention is an image display device for displaying a stereoscopic image based on a parallax barrier scheme using time-division, the image display device including: a plurality of display elements arranged in a matrix on an image display surface of a transmissive type; a plurality of illumination arrangement control elements arranged in a matrix on an illumination arrangement control surface configured to variably control arrangement, on the image display surface, of illumination light emitted from a back surface of the image display surface to the image display surface; and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, wherein each of the plurality of display elements on the image display surface is controlled by using a subpixel as a minimum control unit, and the controller is configured to control the plurality of display elements by changing, based on the number of divisions in the time-division, an arrangement pattern for left image areas of the image display surface in which an image of the left eye image data is displayed and an arrangement pattern for right image areas of the image display surface in which an image of the right eye image data is displayed, respectively, control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and acquire positional information including a distance between at least one eye of the observer and the image display surface, and corrects, based on the positional information acquired, positions of the slit areas on the image display surface as viewed by the observer, by using a width larger than 0 and smaller than a width of one subpixel as a minimum correction unit.

Advantageous Effects of Invention

The image display device, the image display method, and the image display system according to an aspect of the present invention can suppress image interference between the left eye and the right eye and improve the ratio between display luminance and power.

DESCRIPTION OF EMBODIMENTS

Known Image Display System

Figure 1:
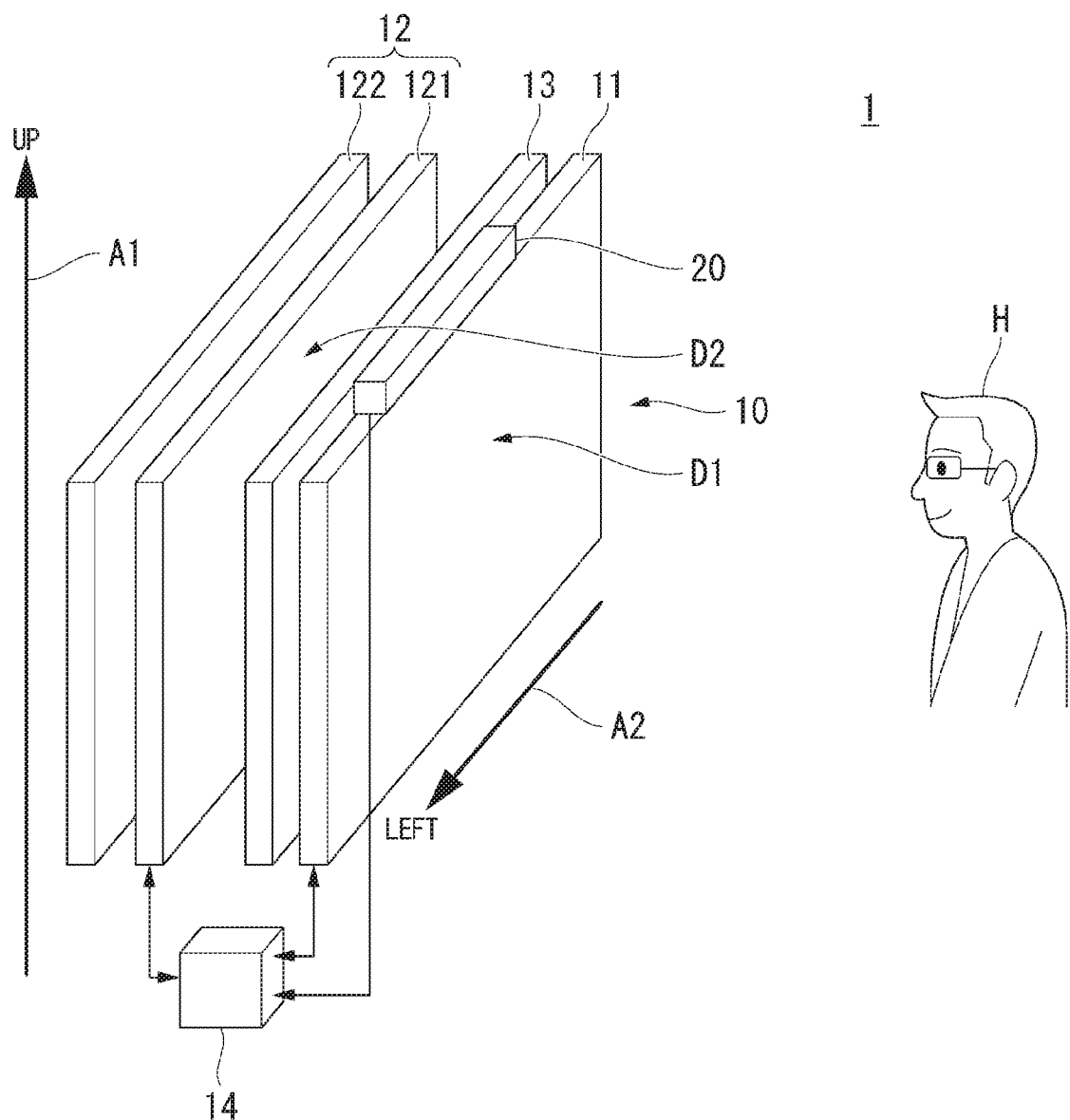
FIG. 1 is a diagram illustrating an example of a configuration of an image display system 1.

First, an image display system X (for example, a known image display system) will be described that is different from an image display system 1 and that displays a stereoscopic image based on a parallax barrier scheme using a plurality of time divisions. In a case where the position of an observer (specifically, the position of the eyes of the observer) of an image displayed on the image display system X is moved, the image display system X shifts the positions of slits in a barrier pattern of the image display system X such that a left eye image is visible to the left eye of the observer. The minimum unit of the shift amount by which the positions of the slits are shifted is one subpixel.

In the image display system X as described above, in a case where the number of time divisions is large (for example, four or more), a slit width, which is the width of each slit described above, is relatively small, and thus the occurrence of crosstalk is suppressed. On the other hand, compared to a configuration with a small number of time divisions (for example, less than four), the image display system X has a problem in that the image appears dark to an observer of the image displayed on the image display system X.

To solve such a problem, it is necessary to increase the slit width by reducing the number of time divisions. However, it is known that, when the slit width is increased by reducing the number of time divisions, the crosstalk is more likely to occur. That is, it is difficult for the image display system X to achieve both higher brightness of the image viewed by the observer and suppression of the occurrence of the crosstalk.

Embodiments

Embodiments of the present invention will be described below with reference to the drawings.

Overview of Image Display System

The overview of an image display system 1 according to an embodiment will now be described.

The image display system 1 displays a stereoscopic image based on a parallax barrier scheme using a prescribed number of time divisions. In an example described below, the image display system 1 displays the stereoscopic image based on a parallax barrier scheme using the time-division in which the number of time divisions is three. Note that the number of time divisions in the image display system 1 may be a real number instead of an integer as long as the number is 2 or larger.

To solve the above-described problems of the image display system X, the image display system 1 is an image display device for displaying a stereoscopic image based on a parallax barrier scheme using time-division, the image display device including a plurality of display elements arranged in a matrix on an image display surface of a transmissive type, a plurality of illumination arrangement control elements arranged in a matrix on an illumination arrangement control surface configured to variably control arrangement, on the image display surface, of illumination light emitted from a back surface of the image display surface to the image display surface, and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface. In the image display system 1, each of the plurality of illumination arrangement control elements on the illumination arrangement control surface is controlled by using a subpixel as a minimum control unit. The controller changes, based on the number of divisions in the time-division, an arrangement pattern for left image areas of the image display surface in which an image of the left eye image data is displayed and an arrangement pattern for right image areas of the image display surface in which an image of the right eye image data is displayed, respectively, to control the plurality of display elements, changes, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, to control the plurality of illumination arrangement control elements, acquires distance information indicating a distance between at least one eye of the observer and the image display surface, and corrects, based on the distance information acquired, a relative positional relationship between the slit areas and the image displayed on the image display surface, by using a width larger than 0 and smaller than the width of one subpixel as a minimum correction unit. Thus, the image display system 1 can suppress image interference between the left eye and the right eye. As a result, the number of divisions in the time-division can be set to less than four, thus improving the ratio between display luminance and power. The image display system 1 can prevent the brightness of the image displayed on the image display surface from becoming lower than the desired brightness and can prevent crosstalk from occurring.

Hereinafter, a configuration of the image display system 1 and a method for displaying an image by using the image display system 1 will be described in detail. Note that the image display method described below may be applied to an image display system that displays a stereoscopic image by using a parallax barrier scheme based on the time-division in which the number of time divisions is four or more.

Configuration of Image Display System

The configuration of the image display system 1 will be described below with reference to FIG. 1. FIG. 1 is a diagram illustrating an example of a configuration of the image display system 1. Note that, for convenience of description, a direction indicated by an arrow A1 illustrated in FIG. 1 is hereinafter referred to as an upward direction or above. For convenience of description, a direction opposite to the upward direction is hereinafter referred to as a downward direction or below. For convenience of description, a direction that is indicated by an arrow A2 illustrated in FIG. 1 and that is orthogonal to the upward direction is hereinafter referred to as a leftward direction or left. For convenience of description, a direction opposite to the leftward direction is hereinafter referred to as a rightward direction or right. As an example, a case in which the upward direction aligns with a direction opposite to the direction of gravity is described below. That is, in this example, the leftward direction aligns with the horizontal direction. Note that the upward direction need not align with the above-described direction.

A subpixel used in the present specification will now be described. The subpixel used in the present specification refers to each of m equal partial pixels (m is an integer of 2 or larger) obtained by equally dividing, along the upward/downward direction, each of pixels constituting an image displayed on the image display system 1 (i.e., n partial pixels arranged in the leftward/rightward direction in each pixel). Note that the subpixel may refer to each of m equal partial pixels obtained by equally dividing each of the pixels constituting the image displayed on the image display system 1 along a direction different from the upward/downward direction. For simplification of description, a case will be described herein in which all the pixels used to display an image are of the same size. In an example described below, the subpixel corresponds to each of three equal partial pixels obtained by equally dividing each of the pixels constituting the image displayed in the image display system 1 along the upward/downward direction. That is, the width of one pixel is equal to the sum of the widths of three subpixels.

The image display system 1 includes an image display device 10 and a distance detection unit 20 separate from the image display device 10. Note that the image display device 10 may be configured to be integrated with the distance detection unit 20.

The image display device 10 includes a first display unit 11, an irradiation unit 12, a diffuser 13, and a control device 14.

The first display unit 11 is an example of the first display unit described above. The first display unit 11 is a transmissive display unit including a first display surface D1 on which a plurality of first subpixels for displaying an image are arranged in a matrix. The first subpixels are subpixels included in the first display unit 11. For example, the first display unit 11 is a transmissive liquid crystal panel including the first display surface D1. Note that instead of the liquid crystal panel, the first display unit 11 may be any other transmissive display unit including the first display surface D1. The first display surface D1 is an example of an image display surface. The first subpixel is an example of a display element.

Here, the first display unit 11 may be a liquid crystal panel that can display color images, or may be a liquid crystal panel that can display only black and white images. In an example described below, the first display unit 11 is a liquid crystal panel that can display color images. In this case, each of the pixels of the first display unit 11 includes three first subpixels including a first subpixel in red, a first subpixel in green, and a first subpixel in blue arranged in this order from left to right (or right to left).

The irradiation unit 12 is an example of the irradiation unit described above. The irradiation unit 12 is an irradiation device emitting, in response to a request from the control device 14, light from a position corresponding to each of the plurality of first subpixels arranged on the first display surface D1.

Here, in the example illustrated in FIG. 1, the irradiation unit 12 includes a second display unit 121 and a light source unit 122.

The second display unit 121 is a transmissive display unit including a second display surface D2 including second subpixels that are subpixels arranged in a matrix and corresponding to the respective first subpixels arranged on the first display surface D. For example, the second display unit 121 is a transmissive liquid crystal panel including the second display surface D2. Note that, instead of the liquid crystal panel, the second display unit 121 may be any other transmissive display unit including the second display surface D2. As an example, in a case described below, the pixel configuration of the second display unit 121 is the same as the pixel configuration of the first display unit 11. The second display surface D2 is an example of the illumination arrangement control surface. The second subpixel is an example of the illumination arrangement control element.

The light source unit 122 emits light to each of the plurality of second subpixels arranged on the second display surface D2. The light source unit 122 is a backlight using, for example, a Light Emitting Diode (LED). Note that the light source unit 122 may be a backlight using any other light source instead of the LED.

Here, in this example, the pixel configuration of the second display unit 121 is the same as the pixel configuration of the first display unit 11 as described above. Thus, the second display unit 121 is a liquid crystal panel that can display color images. In this case, each of the pixels of the second display unit 121 includes three second subpixels including a second subpixel in red, a second subpixel in green, and a second subpixel in blue arranged in this order from left to right (or right to left). That is, the color of light emitted from the light source unit 122 to the first subpixel via a certain second subpixel is one of red, green, and blue. In this case, the first subpixel irradiated with the light may absorb the light instead of transmitting the light, depending on the color of the first subpixel. To solve this problem, in the image display device 10, the diffuser 13 illustrated in FIG. 1 is disposed between the first display unit 11 and the second display unit 121. The diffuser 13 mixes the light emitted from the light source unit 122 to the first display unit 11 via the second display unit 121 to convert the light to white light. Note that the image display device 10 may be configured not to include the diffuser 13. For example, in a case where the second display unit 121 includes black and white subpixels as second subpixels, the image display device 10 may be configured not to include the diffuser 13.

The control device 14 controls the entire image display device 10. The control device 14 displays an image on the first display surface D1 and displays a barrier pattern on the second display surface D2. The barrier pattern is an arrangement of a plurality of slits corresponding to areas including second subpixels transmitting light and barriers corresponding to areas including second subpixels transmitting no light on the second display surface D2.

Here, an image such as a still image, a moving image, or the like is displayed on the first display unit 11. In this example, the first display unit 11 is a transmissive display. Illumination light is emitted from a back surface of the first display unit 11 to cause the image to be visible to an observer.

The second display unit 121 irradiates the first display unit 11 with illumination light.

The first display unit 11 displays a left eye image and a right eye image in different areas within the same frame. The arrangement of the area of the left eye image and the area of the right eye image within the same frame is referred to as a right and left image display arrangement.

The second display unit 121 determines positions for illuminating the first display unit 11 such that the left eye image displayed on the first display unit 11 is visible to the left eye of the observer and the right eye image displayed on the first display unit 11 is visible to the right eye of the observer and illuminates the first display unit 11. The arrangement of the positions for illuminating, by the second display unit 121, the first display unit 11 is referred to as a barrier pattern.

More specifically, the control device 14 reads first image data including image data recorded on a recording medium such as a Hard Disk Drive (HDD), a Solid State Drive (SSD), a Compact Disc (CD), or a Digital Versatile Disc (DVD). The first image data is image data of an image including parallax information. The first image data may be image data of a moving image or image data of a still image. In an example described below, the first image data is the image data of the moving image. The control device 14 may be configured to generate the first image data, based on an operation received from a user, a program recorded on the recording medium, or the like.

Based on the first image data read from the recording medium, the control device 14 generates, for each frame of the first image data, left image data including image data for the left eye of the observer H that observes the first display surface D1 and right image data including image data for the right eye of the observer H. Note that the control device 14 may be configured to read, instead of being configured to generate the left image data and the right image data based on the first image data, each of left image data and right image data from the recording medium that stores each of the left image data and the right image data in advance. The left image data is an example of the left eye image data. The right image data is an example of the right eye image data.

The control device 14 receives, from the user in advance, each of time division number information indicating the number of time divisions, slit width information indicating the slit width that corresponds to the width of each slit described above, and slit inclination information indicating the inclination of the slits. Here, as an example, a case in which the slit width is expressed by the number of subpixels, with the width of each subpixel in the leftward/rightward direction used as a unit of length is described below. Note that, instead of the number of subpixels, any other value may be used to represent the slit width. The control device 14 may be configured to store, in advance, some or all of the time division number information, the slit width information, and the slit inclination information.

The control device 14 determines right and left image display arrangements based on the number of time divisions indicated by the received time division number information, the slit width indicated by the received slit width information, and the inclination of the slits indicated by the received slit inclination information. The right and left image display arrangements are different from each other, and the number of patterns of the right and left image display arrangements corresponds to the number of the time divisions. The right and left image display arrangement refers to an arrangement of left image areas each displaying part of the image indicated by the left image data and right image areas each displaying part of the image indicated by the right image data, the arrangement being on the first display surface D1. The control device 14 causes an image of the right and left image display arrangements to be displayed on the first display surface D1, with the number of patterns corresponding to the number of time divisions. The control device 14 periodically changes the pattern of the right and left image display arrangement in a predetermined order. For example, in a case where the number of the time divisions is three, the control device 14 determines three patterns X1 to X3 of the right and left image display arrangements. Then, the control device 14 periodically changes the pattern of the right and left image display arrangement among the right and left image display arrangements of the patterns X1 to X3 for each frame of the image displayed on the first display surface D1 in the order of, for example, the pattern X1, the pattern X2, the pattern X3, and the pattern X1, . . . . Here, a right and left image display arrangement of a certain pattern, which is one of the right and left image display arrangements arranged in the predetermined order with the number of patterns corresponding to the number of the time divisions, is shifted leftward by a slit width from another right and left image display arrangement of a subsequent pattern that follows the right and left image display arrangement of the certain pattern. For example, in a case where the number of time divisions is three, the pattern X1 and the pattern X2 are shifted by a slit width from each other, the pattern X2 and the pattern X3 are shifted by the slit width from each other, and the pattern X3 and the pattern X1 are shifted by the slit width from each other. Each of the patterns of the right and left image display arrangements is an example of an arrangement pattern for the left image areas of the image display surface in which the image of the left eye image data is displayed and an arrangement pattern for the right image areas of the image display surface in which the image of the right eye image data is displayed, respectively.

Here, in a case of causing an image of a frame to be displayed, the control device 14 causes one image into which the left eye image and the right eye image are combined to be displayed on the first display surface D1 as the image of the frame, in accordance with the image indicated by the left image data of the frame, the image indicated by the right image data of the frame, and the right and left image display arrangement on the first display surface D1. On the first display surface D1 where the one image is displayed, part of the image indicated by the left image data of the frame is displayed in the left image areas of the right and left image display arrangement, the part corresponding to the left image areas, and another part of the image indicated by the right image data of the frame is displayed in the right image areas of the right and left image display arrangement, the other part corresponding to the right image areas.

The control device 14 determines barrier patterns based on a distance indicated by the distance information detected by the distance detection unit 20 described below, the number of time divisions indicated by the received time division number information, the slit width indicated by the received slit width information, and the inclination of the slits indicated by the received slit inclination information. The barrier patterns are different from each other, and the number of patterns of the barrier patterns corresponds to the number of the time divisions. As described above, the barrier pattern is the arrangement of the plurality of slits corresponding to the areas including the second subpixels transmitting light and barriers corresponding to areas including second subpixels transmitting no light on the second display surface D2. The control device 14 causes barrier patterns the number of which corresponds to the number of the time divisions to be displayed on the second display surface D2. The control device 14 periodically changes the pattern of the barrier pattern in a predetermined order. For example, in a case where the number of the time divisions is three, the control device 14 determines three patterns Y1 to Y3 of barrier patterns. In this example, the positions of the slits in the pattern Y1 are shifted leftward by a slit width from the positions of the corresponding slits in the pattern Y2. The positions of the slits in the pattern Y2 are shifted leftward by a slit width from the positions of the corresponding slits in the pattern Y3.

Then, the control device 14 periodically switches among the barrier patterns of the patterns Y1 to Y3 for each frame of the image displayed on the first display surface D1 in the order of, for example, the pattern Y, the pattern Y2, the pattern Y3, and the pattern Y1, . . . . That is, the control device 14 causes periodic changes in the right and left image display arrangement on the first display surface D1 and periodic changes in the barrier pattern on the second display surface D2 to be synchronized for each frame of the image displayed on the first display surface D1.

Here, each of the patterns of the barrier pattern is an example of an arrangement pattern for barrier areas of the illumination arrangement control surface in which illumination light is not generated and an arrangement pattern for slit areas of the illumination arrangement control surface in which illumination light is generated, respectively. The plurality of slits, which are areas of the second subpixels transmitting light among the areas on the second display surface D2, correspond to an example of the slit areas of the illumination arrangement control surface in which illumination light is generated. The barriers, which are areas of the second subpixels transmitting no light among the areas on the second display surface D2, correspond to an example of the barrier areas.

In this way, the control device 14 displays, on the second display surface D2, the barrier pattern corresponding to the pattern of the right and left image display arrangement of the image displayed on the first display surface D1. Thus, in the barrier pattern corresponding to a certain pattern of the right and left image display arrangement, in the slits of the barrier pattern, both the left image areas in the right and left image display arrangement and the right image areas in the right and left image display arrangement are positioned in a predetermined arrangement. The predetermined arrangement is defined based on the positions of the eyes of the observer H and is an arrangement such that, for example, the left half of one slit corresponds to the left image area and the right half of the slit corresponds to the right image area. Thus, the control device 14 can cause the image of the left image areas arranged in the slits to be visible to only the left eye of the observer H and cause the image of the right image areas arranged in the slits to be visible to only the right eye of the observer H.

In a case where the control device 14 causes the image of the right and left image display arrangement corresponding to a certain frame to be displayed on the first display surface D1 and causes the barrier pattern corresponding to the pattern of the right and left image display arrangement to be displayed on the second display surface D2, the observer H observes only parts of the image, the parts overlapping the slits. The control device 14 periodically changes the barrier pattern along with the right and left image display arrangement. As described above, the positions of the slits in the barrier patterns differ by a slit width from one another. Thus, for example, in a case where the number of time divisions is three, the barrier patterns of the patterns Y1 to Y3 are sequentially switched to transmit light through the entire surface of the first display surface D1. Thus, the control device 14 can cause the entire image displayed on the first display surface D1 to be visible to the observer H.

According to the configuration described above, in this example, the image display device 10 can cause an image to be visible to the observer H, the image being displayed on the first display surface D1 in a stereoscopic manner, according to the parallax barrier scheme using the time-division. Thus, the image display device 10 can prevent the brightness of the image displayed on the first display surface D1 from being lower than the desired brightness. However, in a case where the distance between the first display surface D1 and the position of the eyes of the observer H changes, the time-division with a relatively small number (for example, less than four) of time divisions is likely to cause crosstalk to occur in the image display device 10.

Thus, based on distance information detected by the distance detection unit 20, the control device 14 corrects the position of each slit in the barrier pattern on the second display surface D2, by using a width that is larger than 0 and smaller than the width of one subpixel as a minimum correction unit. Here, the distance detection unit 20 detects information corresponding to the relative positions of the eyes of the observer H with respect to the first display surface D1. The information is, for example, distance information indicating a distance between the first display surface D1 and a position corresponding to at least one of the eyes of the observer H. Specifically, the control device 14 acquires, from the distance detection unit 20, the distance information detected by the distance detection unit 20, and based on the acquired distance information, corrects the position of each slit in the barrier pattern on the second display surface D2, by using the width that is larger than 0 and smaller than the width of one subpixel as a minimum correction unit.

Thus, the image display device 10 can prevent the brightness of the image displayed on the first display surface D1 from being lower than the desired brightness and prevent crosstalk from occurring. As an example, in a case described below, the distance indicated by the distance information detected by the distance detection unit 20 corresponds to a distance, in a direction orthogonal to the first display surface D1, between the first display surface D1 and a position corresponding to both eyes of the observer H (for example, an intermediate position between the left eye and the right eye). Note that, the distance indicated by the distance information detected by the distance detection unit 20 may be, instead of the distance, in the direction orthogonal to the first display surface D1, between the first display surface D1 and the position corresponding to both eyes of the observer H (for example, the intermediate position between the left eye and the right eye), any other distance between the first display surface D1 and a position corresponding to at least one eye of the observer H.

As described above, the distance detection unit 20 detects information corresponding to the relative positions of the eyes of the observer H with respect to the first display surface D1. For example, the distance detection unit 20 detects distance information indicating a distance, in the direction orthogonal to the first display surface D1, between the first display surface D1 and the position corresponding to both eyes of the observer H (for example, the position intermediate between the left eye and the right eye). The distance detection unit 20 outputs the detected distance information to the control device 14. The distance detection unit 20 detects planar position information indicating a planar position that is a position corresponding to at least one of the eyes of the observer H and located in a direction along the first display surface D1. The distance detection unit 20 outputs the detected planar position information to the control device 14. As an example, in a case described below, the distance detection unit 20 detects, as planar position information, information indicating a position corresponding to both eyes of the observer and located in the direction along the first display surface D1.

Barrier Pattern Displayed in Second Display Unit

A description is given of each of the state of the first display surface D1 and the state of the second display surface D2 in a case where a barrier pattern of a certain pattern is displayed on the second display surface D2 of the second display unit 121.

Here, the barrier pattern displayed on the second display surface D2 by the control device 14 is characterized by three parameters. That is, the three parameters correspond to the number of time divisions, the slit width, and the inclination of the slits as described above. Here, of the three parameters, the number of time divisions and the slit width have a relationship in which determining one of the parameters causes the other parameter to be determined in a case where the number of pixels (or the number of subpixels) on the second display surface D2 in the leftward/rightward direction is predetermined. In the following description, regardless of this relationship, the number of time divisions, the slit width, and the inclination of the slits are referred to as three parameters.

Here, each slit in the barrier pattern is strip-shaped. The slit width in the barrier pattern indicates the width of such a strip-shaped slit. The inclination of each slit in the barrier pattern is an inclination expressed by an angle θ between a tangent on all of a plurality of vertexes (corners) formed on the left sides of the respective slits, and the upward/downward direction.

Specific Example 1 of Barrier Pattern Formed on Second Display Surface

Now, with reference to FIG. 2, as an example of the barrier pattern displayed on the second display surface D2 based on the three parameters as described above, a barrier pattern P1 will be described that corresponds to a barrier pattern displayed on the second display surface D2 by the control device 14 in a case where the number of time divisions is three, where the slit width in the barrier pattern is four subpixels, and where the inclination θ of the barrier pattern is tan−1 (one subpixel/six subpixels).

Here, in a case described below, each pixel on the second display surface D2 is a square pixel having an aspect ratio of 1:1, and each subpixel has an aspect ratio of 3:1. Note that no such limitation is intended for the aspect ratio of each pixel and the aspect ratio of each subpixel. Note that, in the following description, the first display surface D1 and the second display surface D2 are each what is called a color LCD in which each pixel includes subpixels in red, green, and blue.

Figure 2:
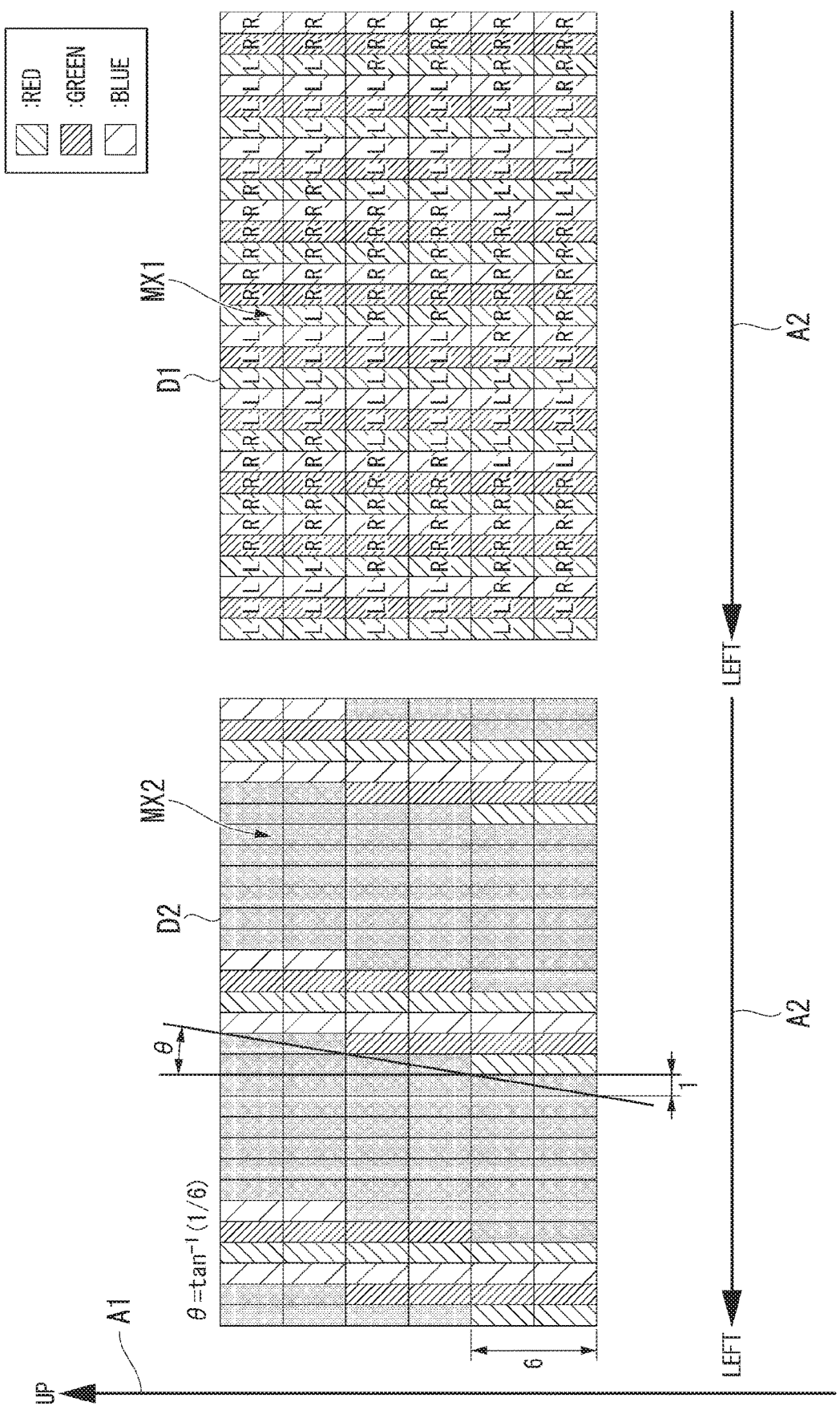
FIG. 2 is a diagram illustrating an example of a state of a first display surface D1 and an example of a state of a second display surface D2 in a case where a barrier pattern P1 is displayed on the second display surface D2 at a certain timing T.

FIG. 2 is a diagram illustrating an example of the state of the first display surface D1 and an example of the state of the second display surface D2 in a case where the barrier pattern P1 is displayed on the second display surface D2 at a certain timing T1. Each of the rectangles on the first display surface D1 illustrated in FIG. 2 indicates each of a plurality of first subpixels arranged on the first display surface D1. That is, as illustrated in FIG. 2, the first subpixels are arranged in a matrix on the first display surface D1. Areas including the first subpixels labeled "L" on the first display surface D1 illustrated in FIG. 2 correspond to the left image areas described above. Areas including the first subpixels labeled "R" on the first display surface D1 illustrated in FIG. 2 correspond to the above-described right image areas.

In a case where the number of time divisions is three, where the slit width in the barrier pattern is four subpixels, and where the inclination θ of the barrier pattern is tan−1 (one subpixel/six subpixels), the left image areas and right image areas described above are arranged, for example, according to an arrangement MX1 illustrated in FIG. 2 at a timing T1. The arrangement MX1 is an example of the right and left image display arrangement on the first display surface D1. In this example, on the first display surface D1, in each row of a matrix including the first subpixels, a left image area including six (i.e., half the number of time divisions multiplied by the slit width) consecutive first subpixels and a right image area including six (i.e., half the number of time divisions multiplied by the slit width) consecutive first subpixels are periodically arranged in the leftward/rightward direction. Such a periodic arrangement includes subpixels shifted leftward by one subpixel every other row in the matrix.

On the other hand, each of the rectangles on the second display surface D2 illustrated in FIG. 2 indicates each of a plurality of second subpixels arranged on the second display surface D2. That is, as illustrated in FIG. 2, the second subpixels are arranged in a matrix on the second display surface D2. Each of the hatched second subpixels on the second display surface D2 illustrated in FIG. 2 indicates a second subpixel transmitting light. Each of the shaded second subpixels on the second display surface D2 illustrated in FIG. 2 indicates a second subpixel transmitting no light.

In a case where the number of time divisions is three, where the slit width in the barrier pattern is four subpixels, and where the barrier pattern has an inclination θ of tan−1 (one subpixel/six subpixels), the barrier pattern is arranged, for example, according to an arrangement MX2 illustrated in FIG. 2 at a Timing T1. The arrangement MX2 is an example of the barrier pattern displayed on the second display surface D2. In this example, on the second display surface D2, in each row of a matrix including the second subpixels, an area including four consecutive second subpixels transmitting light and an area including eight consecutive second subpixels transmitting no light are periodically arranged in the leftward/rightward direction. Such a periodic arrangement includes subpixels shifted leftward by one subpixel every other row in the matrix.

In the example illustrated in FIG. 2, at a timing T1, the left image area is arranged in the left half of each slit, and the right image area is arranged in the right half of the slit, as viewed from the observer H. The left image area is arranged in the left half of each slit, and the right image area is arranged in the right half of each slit such that, in a case of periodically changing each of the pattern of the right and left image display arrangement on the first display surface D1 and the pattern of the barrier pattern on the second display surface D2, the control device 14 can cause the image in the left image area arranged in each slit to be visible to only the left ee of the observer H and cause the image in the right image area arranged in each slit to be visible to only the right eye of the observer H. That is, the image display device 10 can display to the observer H a stereoscopic image based on the parallax barrier scheme using the time-division in which the number of time divisions is three in a case where the slit width is four subpixels and where the slits have an inclination θ of tan−1 (one subpixel/six subpixels).

Here, based on the distance information acquired from the distance detection unit 20, the control device 14 translates leftward or rightward the position of each slit on the second display surface D2 in the barrier pattern to be displayed on the second display surface D2, to prevent crosstalk from occurring even in a case where the distance between the first display surface D1 and the eyes of the observer H changes. That is based on the distance information acquired from the distance detection unit 20, the control device 14 can correct the position of each slit on the second display surface D2 to prevent crosstalk from occurring. Specifically, for example, by changing the state of the second display surface D2 illustrated in FIG. 2 to the state of the second display surface D2 illustrated in FIG. 3, the control device 14 can translate, rightward by half subpixel, the position of each slit on the second display surface D2 illustrated in FIG. 2.

Figure 3:
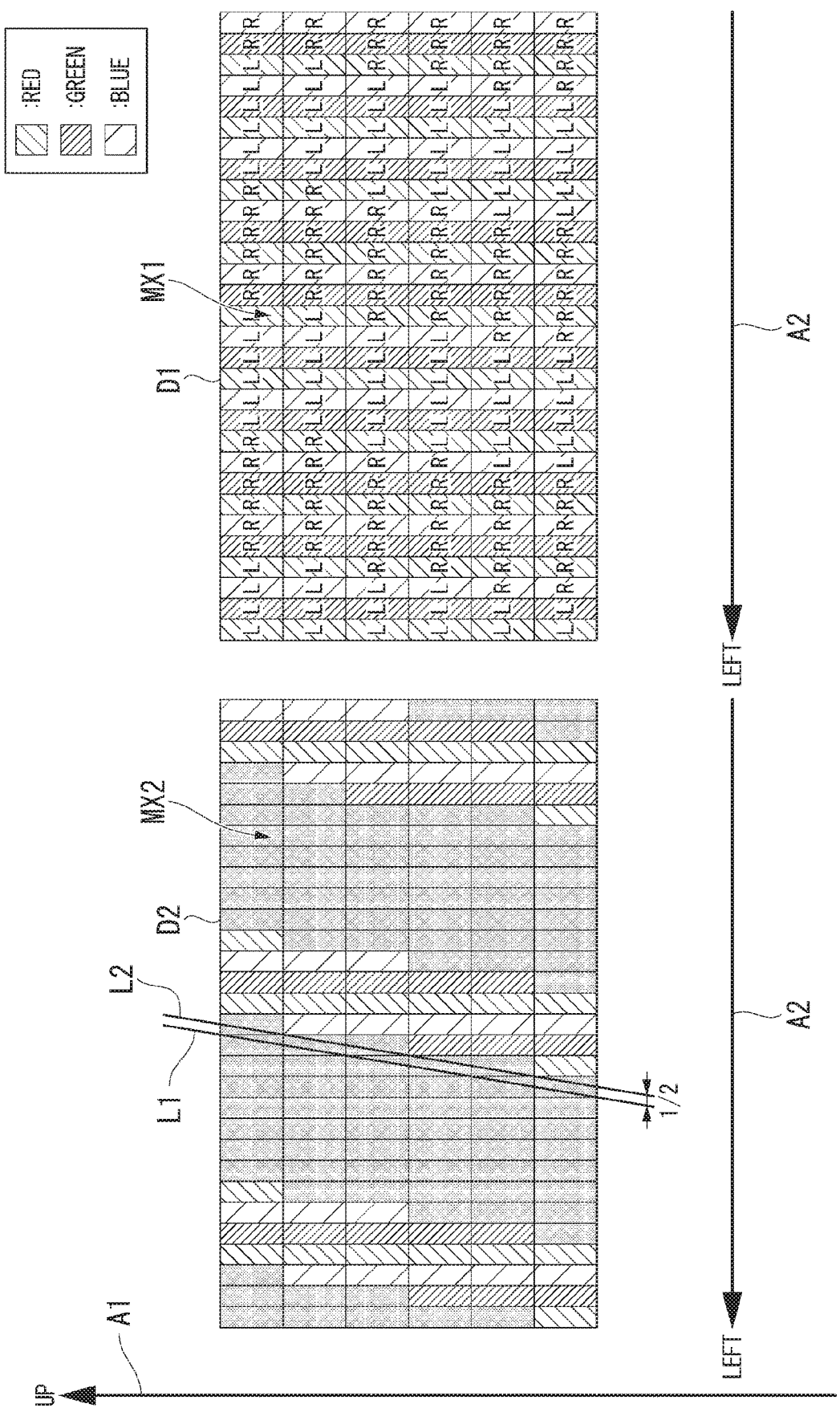
FIG. 3 is a diagram illustrating an example of a barrier pattern displayed on the second display surface D2 illustrated in FIG. 2 in a case where the position of each slit in the barrier pattern on the second display surface D2 are translated rightward by half subpixel.

FIG. 3 is a diagram illustrating an example of the barrier pattern displayed on the second display surface D2 illustrated in FIG. 2 in a case where the position of each slit in the barrier pattern on the second display surface D2 is translated rightward by half subpixel. In FIG. 3, each slit in the barrier pattern displayed on the second display surface D2 illustrated in FIG. 2 is shifted downward by one pixel. At this time, the interval between a tangent L1 on all of a plurality of vertexes (corners) formed on the left sides of the respective slits illustrated in FIG. 2, and a tangent L2 on all of a plurality of vertexes (corners) formed on the left sides of the respective slits illustrated in FIG. 3 is half subpixel. That is, by changing the barrier pattern illustrated in FIG. 2 to shift, downward by one pixel, each slit illustrated in FIG. 2, the control device 14 can translate, rightward by half subpixel, the position, on the second display surface D2, of each slit illustrated in FIG. 2. By changing the barrier pattern illustrated in FIG. 2 to shift, upward by one pixel, each slit illustrated in FIG. 2, the control device 14 can translate, leftward by half subpixel, the position, on the second display surface D2, of each slit illustrated in FIG. 2. According to this method, the control device 14 can translate the position of each slit in the barrier pattern on the second display surface D2 leftward or rightward in units of half subpixels according to the distance indicated by the distance information acquired from the distance detection unit 20. Here, the leftward or rightward direction is an example of the direction orthogonal to the longitudinal direction of the first subpixel. Note that in the example illustrated in FIG. 3, all of the slits illustrated in FIG. 2 are shifted downward by one pixel but the control device 14 can independently shift each slit illustrated in FIG. 2, upward or downward by one pixel.

As described above, in the image display device 10, each slit has inclination angle of larger than 0 and smaller than tan−1 (one subpixel/three subpixels) with respect to the upward/downward direction along the second display surface D2 (i.e., the upward/downward direction along the irradiation unit 12). Accordingly, the image display device 10 can correct the position of each slit on the second display surface D2 by using, as a minimum correction unit, a width that is larger than 0 and smaller than the width of one subpixel.

Note that in the case where each of the slits displayed on the second display surface D2 has an inclination θ of tan−1 (one subpixel/three subpixels), the control device 14 can translate the position of each slit in the barrier pattern on the second display surface D2 leftward or rightward in units of one subpixel. That is, according to the inclination of the slits indicated by the received slit inclination information, the control device 14 can translate the position, on the second display surface D2, of each slit in the barrier pattern displayed on the second display surface D2, by a distance according to the inclination, the distance being larger than 0 and equal to or smaller than one subpixel. Here, the one subpixel is an example of the distance of the width of the first subpixel. The half subpixel is an example of the distance that is larger than 0 and equal to or smaller than the width of the first subpixel.

Specific Example 2 of Barrier Pattern Formed on Second Display Surface

Now, with reference to FIG. 4, as an example of the barrier pattern displayed on the second display surface D2 based on the three parameters, a barrier pattern P2 will be described that corresponds to a barrier pattern displayed on the second display surface D2 by the control device 14 in a case where the number of time divisions is three, where the slit width in the barrier pattern is four subpixels, and where the inclination θ of the barrier pattern is tan−1 (one subpixel/ nine subpixels).

Figure 4:
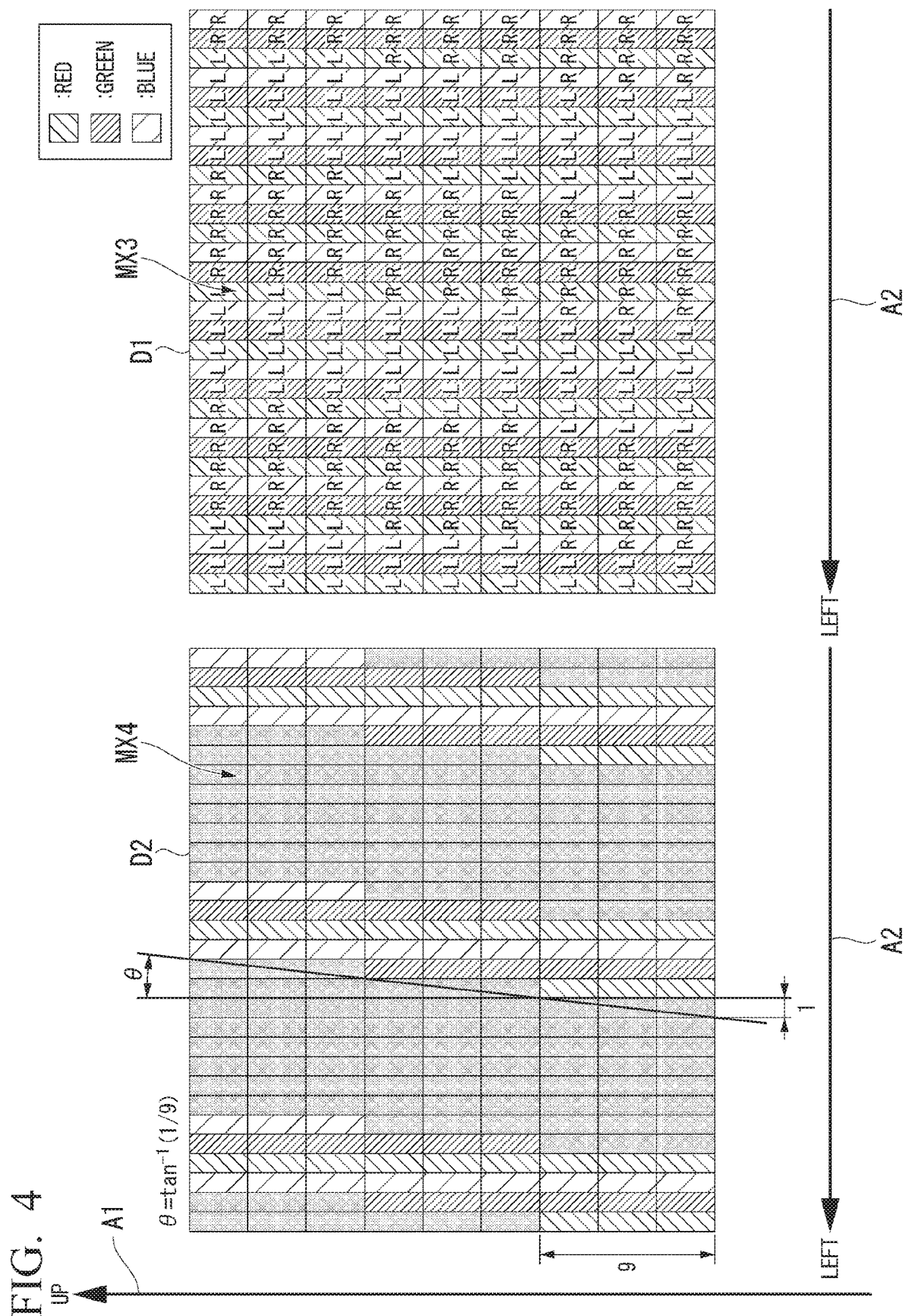
FIG. 4 is a diagram illustrating an example of the state of the first display surface D1 and an example of the state of the second display surface D2 in a case where a barrier pattern P2 is displayed on the second display surface D2 at a certain timing T2.

FIG. 4 is a diagram illustrating an example of the state of the first display surface D1 and an example of the state of the second display surface D2 in a case where the barrier pattern P2 is displayed on the second display surface D2 at a certain timing T2. Each of the rectangles on the first display surface D1 illustrated in FIG. 4 indicates each of a plurality of first subpixels arranged on the first display surface D1. That is, as illustrated in FIG. 4, the first subpixels are arranged in a matrix on the first display surface D1. Areas including the first subpixels labeled "L" on the first display surface D1 illustrated in FIG. 4 corresponds to the left image areas described above. Areas including the first subpixels labeled "R" on the first display surface D1 illustrated in FIG. 4 corresponds to the right image areas described above.

In a case where the number of time divisions is three, where the slit width in the barrier pattern is four subpixels, and where the inclination θ of the barrier pattern is tan−1 (one subpixel/nine subpixels), the left image areas and right image areas described above are arranged according to an arrangement MX3 illustrated in FIG. 4 at a timing T2. The arrangement MX3 is an example of the right and left image display arrangement on the first display surface D. In this example, on the first display surface D1, in each row of a matrix including the first subpixels, a left image area including six (i.e., half the number of time divisions multiplied by the slit width) consecutive first subpixels and a right image area including six (i.e., half the number of time divisions multiplied by the slit width) consecutive first subpixels are periodically arranged in the leftward/rightward direction. Such a periodic arrangement includes subpixels shifted leftward by one subpixel every third row in the matrix.

On the other hand, each of the rectangles on the second display surface D2 illustrated in FIG. 4 indicates each of the plurality of second subpixels arranged on the second display surface D2. That is, as illustrated in FIG. 4, the second subpixels are arranged in a matrix on the second display surface D2. Each of the hatched second subpixels on the second display surface D2 illustrated in FIG. 4 indicates a second subpixel transmitting light. Each of the shaded second subpixels on the second display surface D2 illustrated in FIG. 4 indicates a second subpixel transmitting no light.

In a case where the number of time divisions is three, where the slit width in the barrier pattern is four subpixels, and where the barrier pattern has an inclination θ of tan−1 (one subpixel/nine subpixels), the barrier pattern is arranged, for example, according to an arrangement MX4 illustrated in FIG. 4 at a Timing T2. The arrangement MX4 is an example of the barrier pattern displayed on the second display surface D2. In this example, on the second display surface D2, in each row of a matrix including the second subpixels, an area including four consecutive second subpixels transmitting light and an area including eight consecutive second subpixels transmitting no light are periodically arranged in the leftward/rightward direction. Such a periodic arrangement includes subpixels shifted leftward by one subpixel every third row in the matrix.

In the example illustrated in FIG. 4, at the timing T2, the left image area is arranged in the left half of each slit and the right image area is arranged in the right half of the slit, as viewed from the observer H. The left image area is arranged in the left half of each slit, and the right image area is arranged in the right half of the slit such that, in a case of periodically changing each of the pattern of the right and left image display arrangement on the first display surface D1 and the pattern of the barrier pattern on the second display surface D2, the control device 14 can cause the image in the left image area arranged in the slit to be visible to only the left eye of the observer H and cause the image in the right image area arranged in the slit to be visible to only the right eye of the observer H. That is, the image display device 10 can display to the observer H a stereoscopic image based on the parallax barrier scheme using the time-division in which the number of time divisions is three in a case where the slit width is four subpixels and where the slits have an inclination θ of tan−1 (one subpixel/nine subpixels).

Figure 5:
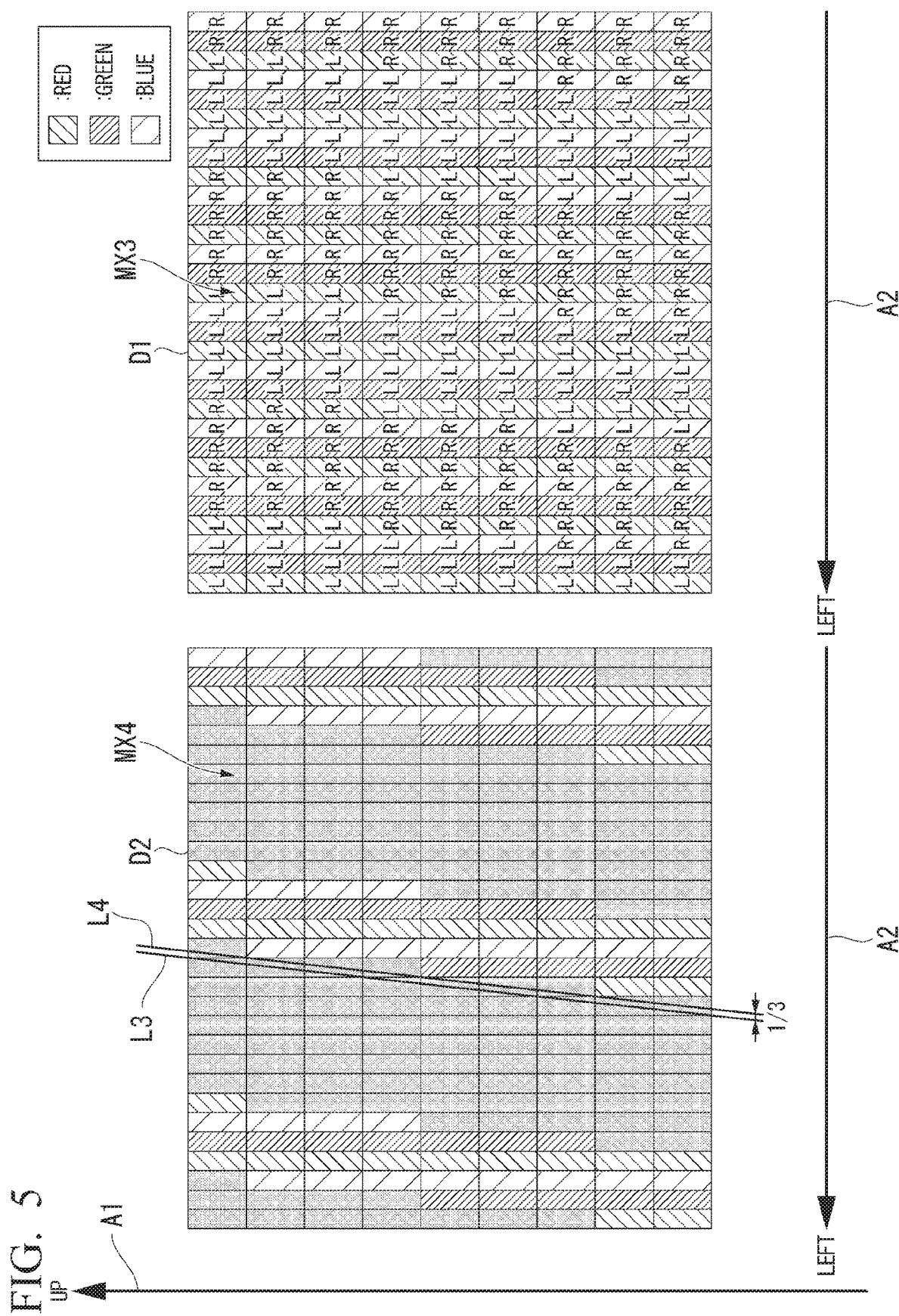
FIG. 5 is a diagram illustrating an example of a barrier pattern displayed on the second display surface D2 illustrated in FIG. 4 in a case where the positions of slits in the barrier pattern on the second display surface D2 are translated rightward by one third subpixel.

Here, for example, by changing the state of the second display surface D2 illustrated in FIG. 4 to the state of the second display surface D2 illustrated in FIG. 5, the control device 14 can translate, rightward by one third subpixel, the position of each slit on the second display surface D2 illustrated in FIG. 4.

FIG. 5 is a diagram illustrating an example of the barrier pattern displayed on the second display surface D2 illustrated in FIG. 4 in a case where the position of each slit in the barrier pattern on the second display surface D2 is translated rightward by one third subpixel. In FIG. 5, each slit in the barrier pattern displayed on the second display surface D2 illustrated in FIG. 4 is shifted downward by one pixel. At this time, the interval between a tangent L3 on all of a plurality of vertexes (corners) formed on the left sides of the respective slits illustrated in FIG. 4, and a tangent L4 on all of a plurality of vertexes (corners) formed on the left sides of the respective slits illustrated in FIG. 5 is one third subpixel. That is, by changing the barrier pattern illustrated in FIG. 4 to shift, downward by one pixel, each slit illustrated in FIG. 4, the control device 14 can translate, rightward by one third subpixel, the position, on the second display surface D2, of each slit illustrated in FIG. 4. By changing the barrier pattern illustrated in FIG. 4 to shift, upward by one pixel, each slit illustrated in FIG. 4, the control device 14 can translate, leftward by one third subpixel, the position, on the second display surface D2, of each slit illustrated in FIG. 4. According to this method, the control device 14 can translate the position of each slit in the barrier pattern on the second display surface D2 leftward or rightward in units of one third subpixels according to the distance indicated by the distance information acquired from the distance detection unit 20. Here, the leftward or rightward direction is an example of the direction orthogonal to the longitudinal direction of the first subpixel. Note that in the example illustrated in FIG. 5, all of the slits illustrated in FIG. 4 are shifted downward by one pixel but the control device 14 can independently shift each slit illustrated in FIG. 4, upward or downward by one pixel. Thus, the image display device 10 can display a stereoscopic image to the observer H while more reliably suppressing crosstalk. The one third subpixel is an example of the distance that is larger than 0 and equal to or smaller than the width of the first subpixel.

Specific Example 3 of Barrier Pattern Formed on Second Display Surface

Here, as a modified example, a barrier pattern will be described that is formed on the second display surface in a case where the image display device 10 is an image display device that displays a stereoscopic image based on a parallax barrier scheme using time division in which the number of time divisions is four or larger. Now, with reference to FIG. 6, as an example of the barrier pattern displayed on the second display surface D2 based on the three parameters, a barrier pattern P3 will be described that corresponds to a barrier pattern displayed on the second display surface D2 by the control device 14 in a case where the number of time divisions is four, where the slit width in the barrier pattern is two subpixels, and where the inclination θ of the barrier pattern is tan−1 (one subpixel/six subpixels).

Figure 6:
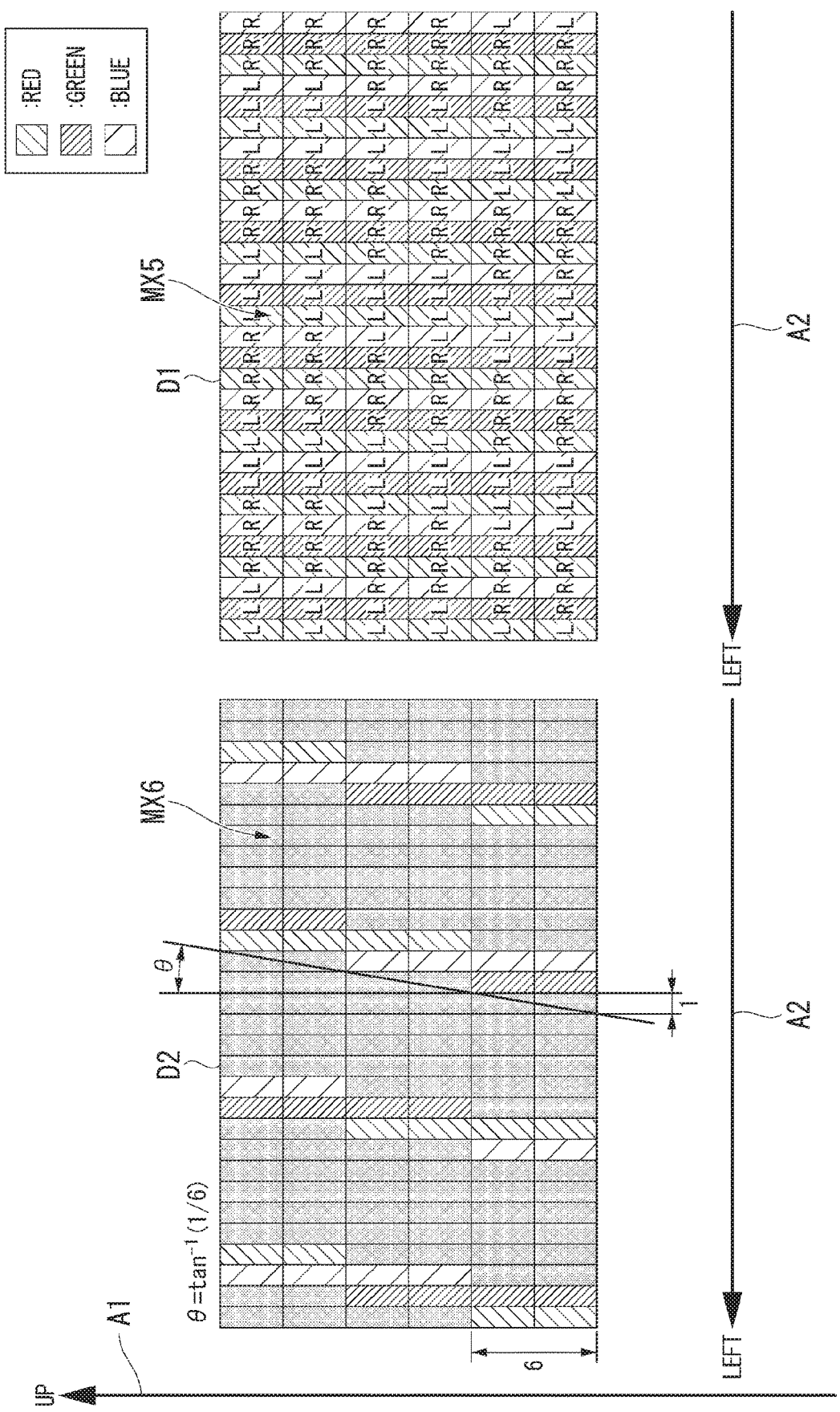
FIG. 6 is a diagram illustrating an example of the state of the first display surface D1 and an example of the state of the second display surface D2 in a case where a barrier pattern P3 is displayed on the second display surface D2 at a certain timing T3.

FIG. 6 is a diagram illustrating an example of the state of the first display surface D1 and an example of the state of the second display surface D2 in a case where the barrier pattern P3 is displayed on the second display surface D2 at a certain timing T3. Each of the rectangles on the first display surface D1 illustrated in FIG. 6 indicates each of a plurality of first subpixels arranged on the first display surface D1. That is, as illustrated in FIG. 6, the first subpixels are arranged in a matrix on the first display surface D1. Areas including the first subpixels labeled "L" on the first display surface D1 illustrated in FIG. 6 correspond to the left image areas described above. Areas including the first subpixels labeled "R" on the first display surface D1 illustrated in FIG. 6 correspond to the right image areas described above.

In a case where the number of time divisions is four, where the slit width in the barrier pattern is two subpixels, and where the inclination θ of the barrier pattern is tan−1 (one subpixel/six subpixels), the above-described left image areas and right image areas are arranged, for example, according to an arrangement MX5 illustrated in FIG. 6 at a timing T3. The arrangement MX5 is an example of the right and left image display arrangement on the first display surface D1. In this example, on the first display surface D1, in each row of a matrix including the first subpixels, a left image area including four (i.e., half the number of time divisions multiplied by the slit width) consecutive first subpixels and a right image area including four (i.e., half the number of time divisions multiplied by the slit width) consecutive first subpixels are periodically arranged in the leftward/rightward direction. Such a periodic arrangement includes subpixels shifted leftward by one subpixel every other row in the matrix.

On the other hand, each of the rectangles on the second display surface D2 illustrated in FIG. 6 indicates each of the plurality of second subpixels arranged on the second display surface D2. That is, as illustrated in FIG. 6, the second subpixels are arranged in a matrix on the second display surface D2. Each of the hatched second subpixels on the second display surface D2 illustrated in FIG. 6 indicates a second subpixel transmitting light. Each of the shaded second subpixels on the second display surface D2 illustrated in FIG. 6 indicates a second subpixel transmitting no light.

In a case where the number of time divisions is four, where the slit width in the barrier pattern is two subpixels, and where the barrier pattern has an inclination θ of tan−1 (one subpixel/six subpixels), the barrier pattern is arranged, for example, according to an arrangement MX6 illustrated in FIG. 6 at a Timing T3. The arrangement MX6 is an example of the barrier pattern displayed on the second display surface D2. In this example, on the second display surface D2, in each row of a matrix including the second subpixels, an area including two consecutive second subpixels transmitting light and an area including six consecutive second subpixels transmitting no light are periodically arranged in the leftward/rightward direction. Such a periodic arrangement includes subpixels shifted leftward by one subpixel every other row in the matrix.

In the example illustrated in FIG. 6, at the timing T3, the left image area is arranged in the left half of each slit and the right image area is arranged in the right half of the slit, as viewed from the observer H. The left image area is arranged in the left half of each slit, and the right image area is arranged in the right half of the slit such that, in a case of periodically changing each of the pattern of the right and left image display arrangement on the first display surface D1 and the pattern of the barrier pattern on the second display surface D2, the control device 14 can cause the image in the left image area arranged in the slit to be visible to only the left eye of the observer H and cause the image in the right image area arranged in the slit to be visible to only the right eye of the observer H. That is, the image display device 10 can display to the observer H a stereoscopic image based on the parallax barrier scheme using the time-division in which the number of time divisions is four in a case where the slit width is two subpixels and where the slits have an inclination θ of tan−1 (one subpixel/six subpixels).

Figure 7:
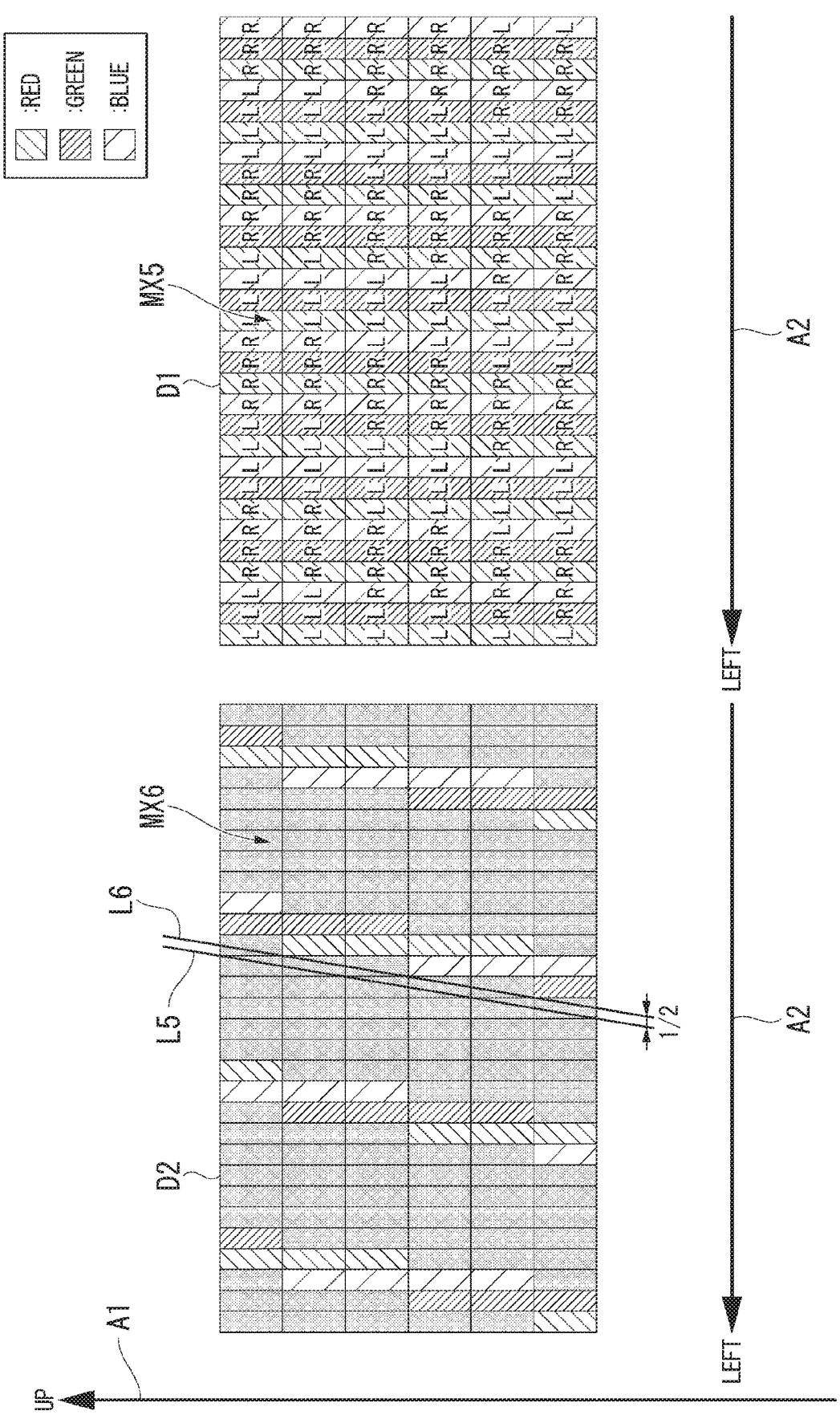
FIG. 7 is a diagram illustrating an example of a barrier pattern displayed on the second display surface D2 illustrated in FIG. 6 in a case where the positions of slits in the barrier pattern on the second display surface D2 are translated rightward by half subpixel.

Here, for example, by changing the state of the second display surface D2 illustrated in FIG. 6 to the state of the second display surface D2 illustrated in FIG. 7, the control device 14 can translate, rightward by half subpixel, the position of each slit on the second display surface D2 illustrated in FIG. 6.

FIG. 7 is a diagram illustrating an example of the barrier pattern displayed on the second display surface D2 illustrated in FIG. 6 in a case where the positions of slits in the barrier pattern on the second display surface D2 are translated rightward by half subpixel. In FIG. 7, each slit in the barrier pattern displayed on the second display surface D2 illustrated in FIG. 6 is shifted downward by one pixel. At this time, the interval between a tangent L5 on all of a plurality of vertexes (corners) formed on the left sides of the respective slits illustrated in FIG. 6 and a tangent L6 on all of a plurality of vertexes (corners) formed on the left sides of the respective slits illustrated in FIG. 7 is half subpixel. That is, by changing the barrier pattern illustrated in FIG. 6 to shift, downward by one pixel, each slit illustrated in FIG. 6, the control device 14 can translate, rightward by half subpixel, the position, on the second display surface D2, of each slit illustrated in FIG. 6. By changing the barrier pattern illustrated in FIG. 6 to shift, upward by one pixel, each slit illustrated in FIG. 6, the control device 14 can translate, leftward by half subpixel, the position, on the second display surface D2, of each slit illustrated in FIG. 6. According to this method, the control device 14 can translate the position of each slit in the barrier pattern on the second display surface D2 leftward or rightward in units of half subpixels according to the distance indicated by the distance information acquired from the distance detection unit 20. Here, the leftward or rightward direction is an example of the direction orthogonal to the longitudinal direction of the first subpixel. Note that in the example illustrated in FIG. 7, all of the slits illustrated in FIG. 6 are shifted downward by one pixel but the control device 14 can independently shift each slit illustrated in FIG. 6, upward or downward by one pixel. Thus, the image display device 10 can display a stereoscopic image to the observer H while more reliably suppressing crosstalk. The half subpixel is an example of the distance that is larger than 0 and equal to or smaller than the width of the first subpixel.

As described above, in the image display device 10, each slit has inclination angle of larger than 0 and smaller than tan−1 (one subpixel/three subpixels) with respect to the upward/downward direction along the second display surface D2 (i.e., the upward/downward direction along the irradiation unit 12). Accordingly, the image display device 10 can correct the position of each slit on the second display surface D2 by using, as a minimum correction unit, a width that is larger than 0 and smaller than the width of one subpixel.

Functional Configuration of Control Device

Figure 8:
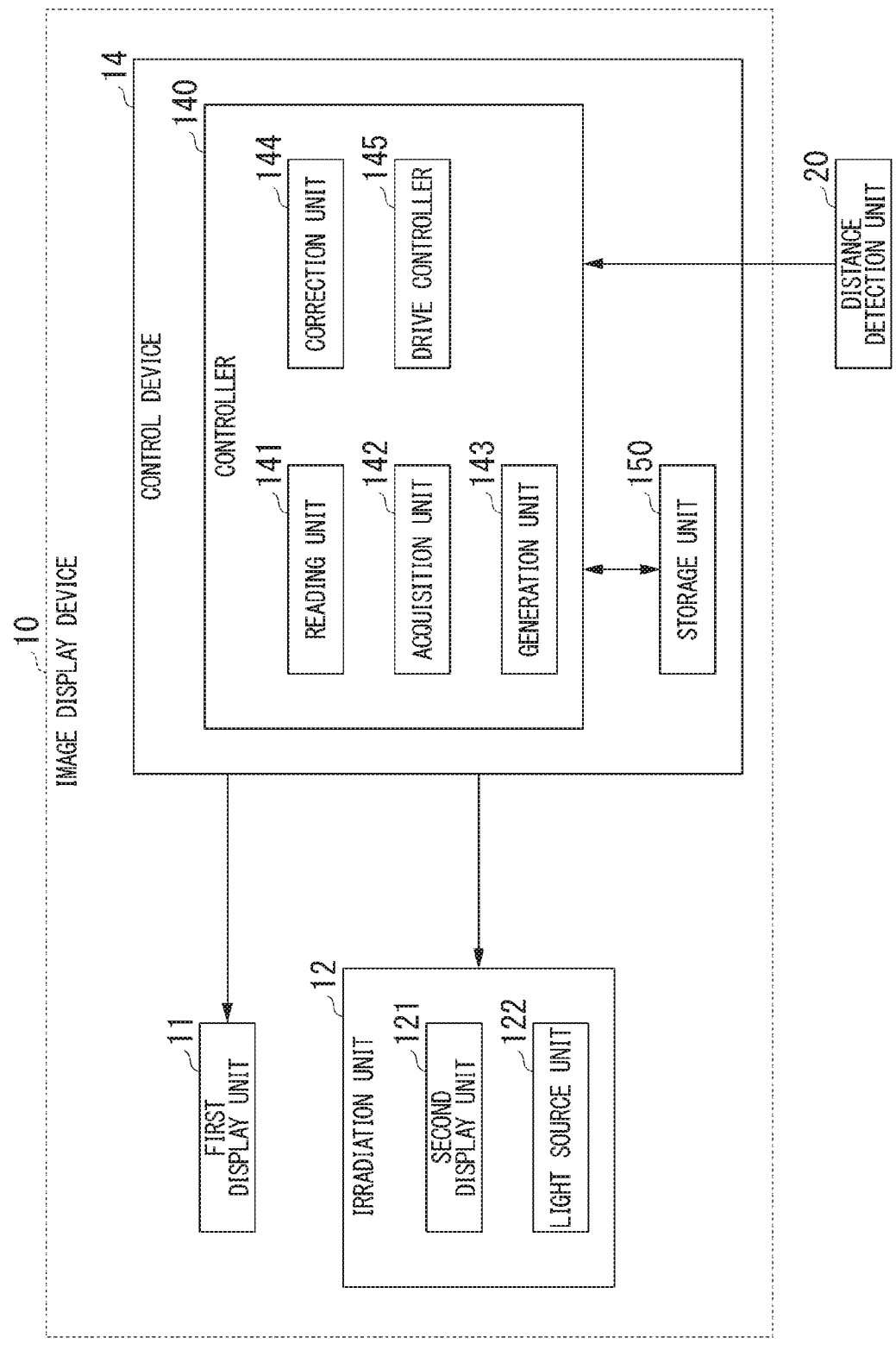
FIG. 8 is a diagram illustrating an example of a functional configuration of a control device 14.

With reference to FIG. 8, a functional configuration of the control device 14 will be described below. FIG. 8 is a diagram illustrating an example of a functional configuration of the control device 14.

The control device 14 includes a controller 140 and a storage unit 150.

The controller 140 controls the entire control device 14. The controller 140 includes a reading unit 141, an acquisition unit 142, a generation unit 143, a correction unit 144, and a drive controller 145. These functional units included in the controller 140 are implemented, for example, by a Central Processing Unit (CPU) (not illustrated) executing various programs stored in the storage unit 150, which will be described below. Some or all of the functional units may be hardware functional units such as Application Specific Standard Products (ASSPs) or Application Specific Integrated Circuits (ASICs).

The reading unit 141 reads out various information stored in advance in the storage unit 150 by a user.

The acquisition unit 142 acquires, from the distance detection unit 20, distance information indicating the distance detected by the distance detection unit 20.

The generation unit 143 generates left image data and right image data based on the first image data read from the storage unit 150 by the reading unit 141.

Based on the distance information acquired by the acquisition unit 142 from the distance detection unit 20, the correction unit 144 translates, leftward or rightward by a distance according to the distance indicated by the distance information, each of the slits in the barrier pattern displayed on the second display surface D2 by the drive controller 145 described below.

The drive controller 145 causes an image to be displayed on the first display surface D1 of the first display unit 11 based on the three parameters received from the user and the left image data and the right image data generated by the generation unit 143. The drive controller 145 acquires distance information from the distance detection unit 20. The drive controller 145 causes a barrier pattern to be displayed on the second display surface D2 of the second display unit 121 based on the distance indicated by the distance information acquired from the distance detection unit 20 and the three parameters received from the user.

Processing for Displaying Barrier Pattern on Second Display Surface

Figure 9:
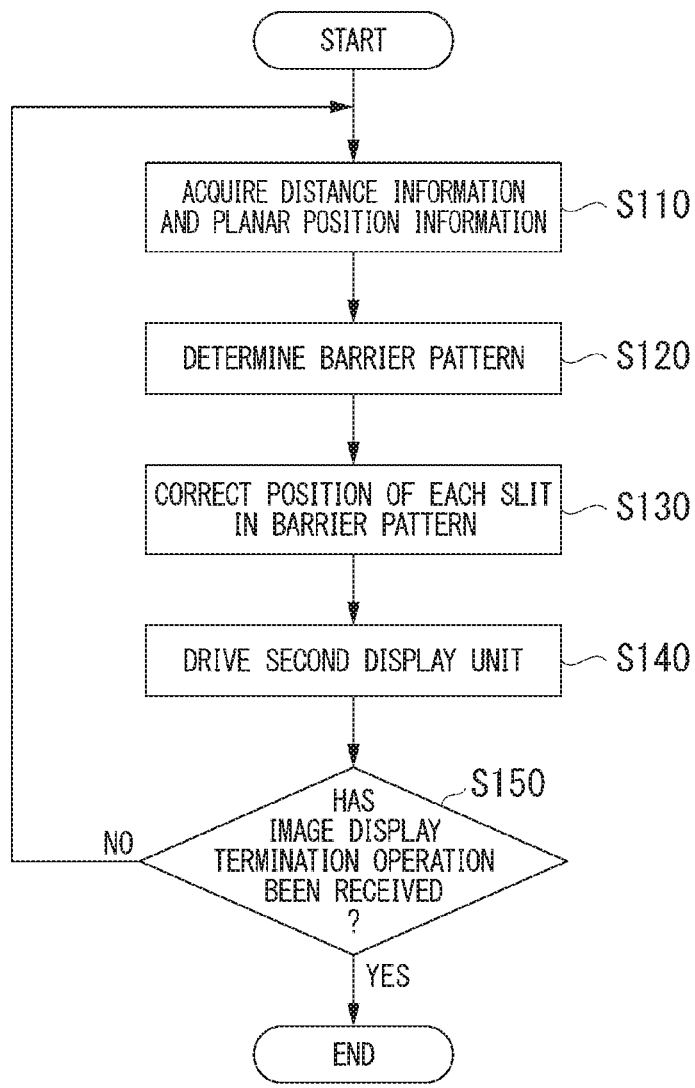
FIG. 9 is a diagram illustrating an example flowchart of processing in which the control device 14 causes the barrier pattern to be displayed on the second display surface D2.

With reference to FIG. 9, a process in which the control device 14 causes the barrier pattern to be displayed on the second display surface D2 will be described below. FIG. 9 is a diagram illustrating an example of a flowchart of the process in which the control device 14 causes the barrier pattern to be displayed on the second display surface D2. Note that, in a case described with reference to the flowchart illustrated in FIG. 9, at a timing before processing in step S110 is performed, the control device 14 receives the three parameters described above from the user.

The acquisition unit 142 acquires, from the distance detection unit 20, the distance information detected by the distance detection unit 20, and acquires, from the distance detection unit 20, the planar position information detected by the distance detection unit 20 (step S110).

Figure 11:
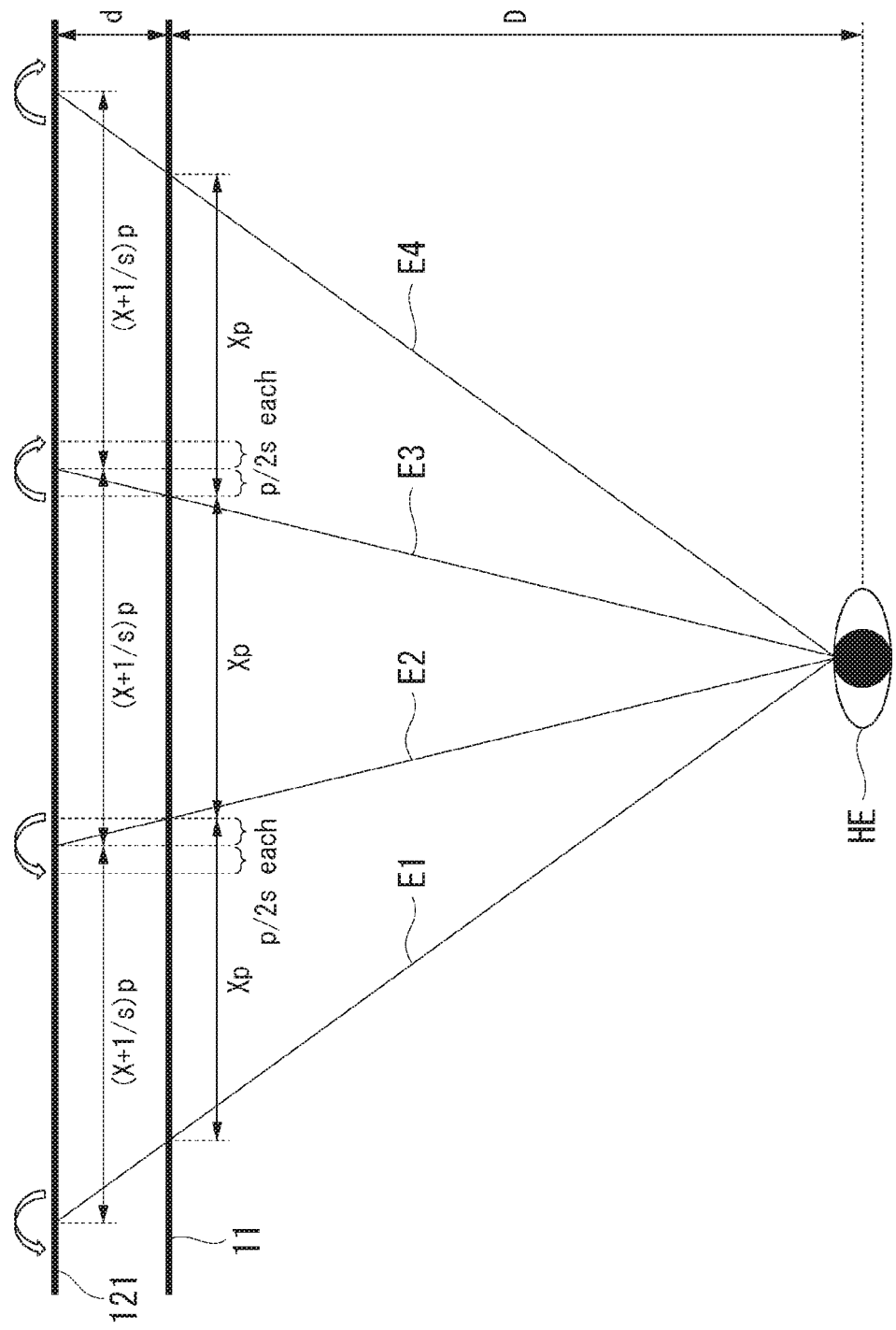
FIG. 11 is a diagram for illustrating a method for calculating, when a barrier pattern to be displayed on the second display surface D2 is determined, the positions of the slits in the barrier pattern.

Next, the drive controller 145 determines a barrier pattern of a pattern to be displayed on the second display surface D2 based on the distance indicated by the distance information acquired by the acquisition unit 142 in step S110 and the three parameters received in advance from the user (step S120). Note that a calculation method described with reference to FIG. 11 is used for calculation used to determine the barrier pattern in step S120.

Next, the drive controller 145 corrects the position, on the second display surface D2, of each slit in the barrier pattern of the pattern determined in step S120 by translating the position in a direction corresponding to the planar position indicated by the planar position information acquired by the acquisition unit 142 in step S110, by a distance corresponding to the planar position (step S130). Note that the processing in step S130 may be performed by a known method or a method to be developed in the future, and thus description of the processing is omitted.

Next, the drive controller 145 causes the barrier pattern in which the position of each slit on the second display surface D2 is corrected in step S130 to be displayed on the second display surface D2 (step S140).

Next, the drive controller 145 determines whether an image display termination operation has been received from the user or not, the image display termination operation being an operation to terminate the display of an image on the image display device 10 (step S150). In a case where the drive controller 145 determines that the image display termination operation has not been received from the user (NO in step S150), the acquisition unit 142 transitions to step S110 and acquires distance information and planar position information from the distance detection unit 20 again. On the other hand, in a case of determining that the image display termination operation has been received from the user (step S150-YES), the drive controller 145 terminates the processing.

Processing for Displaying Image on First Display Surface

Figure 10:
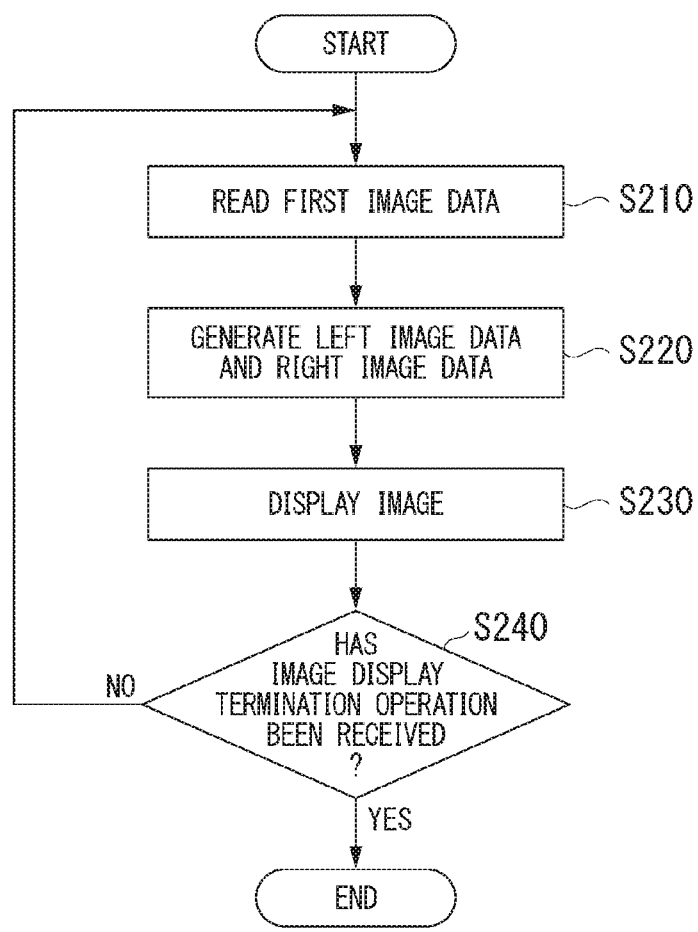
FIG. 10 is a diagram illustrating an example flowchart of processing in which the control device 14 causes an image indicated by second image data to be displayed on the first display surface D1.

With reference to FIG. 10, processing in which the control device 14 causes an image to be displayed on the first display surface D1 will be described below. FIG. 10 is a diagram illustrating an example of a flowchart of processing in which the control device 14 causes an image to be displayed on the first display surface D1. Note that, in a case described with reference to the flowchart illustrated in FIG. 10, at a timing before processing in step S210 is performed, the control device 14 receives the three parameters described above from the user. The processing in the flowchart illustrated in FIG. 10 is synchronized, for each frame, with the processing in the flowchart illustrated in FIG. 9, as described above.

The reading unit 141 reads, from the recording medium, the first image data stored in the recording medium (step S210). As described above, the first image data is image data of an image including parallax information. Here, the reading unit 141 reads the first image data stored in the recording medium from a built-in recording medium in the control device 14, an information reading device for reading information from the built-in recording medium in the control device 14, an information reading device externally connected to the control device 14, or the like.

Next, the generation unit 143 generates left image data and right image data described above based on the first image data read by the reading unit 141 in step S210 (step S220).

Next, the drive controller 145 determines the pattern of the right and left image display arrangement based on the three parameters received in advance from the user. Then, the drive controller 145 causes an image to be displayed on the first display surface D1 based on the right and left image display arrangement of the determined pattern and the left image data and the right image data generated by the generation unit 143 in step S220 (step S230).

Next, the drive controller 145 determines whether the image display termination operation described above has been received from the user (step S240). In a case where the drive controller 145 determines that the image display termination operation has not been received from the user (NO in step S240), the reading unit 141 transitions to step S210, and reads the first image data from the recording medium again. On the other hand, in a case where the drive controller 145 determines that the image display termination operation has been received from the user (YES in step S240), the drive controller 145 terminates the processing.

Method for Distance Calculation According to Distance Indicated by Distance Information Here, in step S130 illustrated in FIG. 9, a method for calculating the position of each slit in the barrier pattern will be described, the method being used when a barrier pattern to be displayed on the second display surface D2 is determined.

FIG. 11 is a diagram for illustrating a method for calculating, when a barrier pattern to be displayed on the second display surface D2 is determined, the positions of the slits in the barrier pattern. An eye HE illustrated in FIG. 11 represents an example of the position of one of both eyes of the observer H. A distance D illustrated in FIG. 11 is an example of a distance detected by the distance detection unit 20. In the example illustrated in FIG. 11, the distance D is a distance between the position of the one eye and the first display surface D1, in the direction orthogonal to the first display surface D1. A distance d illustrated in FIG. 11 represents an example of the distance between the first display unit 11 and the second display unit 121. s in FIG. 11 represents a real number used in a case where the inclination θ indicated by the slit inclination information received by the control device 14 in advance from the user is tan−1 (one subpixel/three subpixels×s). For example, for θ=tan−1 (one subpixel/six subpixels), s is 2. p represents the width of one subpixel. Each of lines E1 to E4 illustrated in FIG. 11 represents a line of sight from the one eye to each of four visible first subpixels. Xp in FIG. 11 represents, by using the distance p as a unit, the distance from a first subpixel visible to the one eye to another first subpixel that is closest to the first subpixel and visible to the one eye. Here, the intersection between each of the lines E1 to E4 in FIG. 11 and the first display surface D1 indicates the position of the first subpixel on the first display surface D1 as viewed from the position of the eye HE. The intersection between each of the lines E1 to E4 and the second display surface D2 indicates the position of the slit on the second display surface D2 as viewed from the position of the eye HE. From the similarity of the triangles formed by combination of two of lines E1 to E4 illustrated in FIG. 11, Equation (1) is derived as follows:

$$(X \times p)/(X+(1/s) \times p) = D/(D+d) \quad (1)$$

When Equation (1) above is solved for X, X is expressed by Equation (2) below.

$$X = D/(s \times d) \quad (2)$$

Here, the real number s is a value that is predetermined from the inclination indicated by the slit inclination information received by the user. The distance d is a value that is predetermined in a design phase of the image display device 10. That is, the X changes depending on the distance D. Accordingly, the correction unit 144 can determine a barrier pattern by translating each slit leftward or rightward for each value of (D/(s×d)) according to the distance D. Note that the amount of translation of each slit may be alternatively calculated by any other method.

Suppression of Crosstalk by Correction of Barrier Pattern

The suppression of crosstalk by the correction of the barrier pattern described above is guaranteed by Equation (3) indicated below.

[Formula 1]

$$\Delta L = \Delta R = (3 - 2\alpha - 2\beta)pD/d \quad (3)$$

Equation (3) is already known. Thus, a document containing a detailed description of Equation (3) is cited here, and description of Equation (3) is omitted.

Examples of the document containing a detailed description of Equation (3) include "H. Kakeya, H. Takahashi, and K. Okada. "Parallax based autostereoscopic display with a deep viewing zone," Proc. IDW, 3DSA3/3D3-2, 2016."

ΔL and ΔR in Equation (3) above are values for indicating the area widths over which the left eye image and the right eye image are respectively visible to each of the left and right eyes without crosstalk, and larger values of ΔL and ΔR enable stereoscopic viewing with less crosstalk. α is the aperture ratio of the slits and is a value determined depending on devices constituting the first display unit 11 and the second display unit 121. β is half of the moving unit of the barrier pattern based on the slit width as described above. In a case where the slit width is four subpixels, β=⅛ for one-subpixel translation being a minimum movement unit. In a case where θ=tan−1 (one subpixel/nine subpixels), β=1/24 because ⅓ subpixel translation is enabled. Note that the document described above states that positive values of ΔL and ΔR provide viewing zones without crosstalk and that larger values of ΔL and ΔR increase an allowable range for movement in the depth direction of the head.

Modified Examples of Embodiments

The image display device 10 described above may include, in addition to the distance detection unit 20, a brightness detection unit configured to detect the brightness of ambient light in a room in which the image display device 10 is installed. In this case, the control device 14 changes the number of time divisions indicated by the time division number information received from the user to a number corresponding to the brightness detected by the brightness detection unit. Accordingly, the control device 14 can change, in accordance with the ambient light in the room, the brightness of the image displayed on the first display surface D1 of the first display unit 11 to a brightness corresponding to the ambient light. As a result, the control device 14 can more reliably prevent the brightness of the image displayed on the first display surface D1 from being lower than the desired brightness.

In the image display device 10 described above, the second display unit 121 may be arranged relative to the first display unit 11 such that the sequence of the first subpixels on the first display surface D1 corresponding to each of red, green, and blue is the reverse of the sequence of the second subpixels on the second display surface D2 corresponding to each of red, green, and blue. In this case, in the image display device 10, for example, in a case where an image with nine viewpoints is displayed around each of the right eye of the observer H and the left eye of the observer H, image display for a total of 18 viewpoints can be achieved by causing the three colors to express light rays in different directions and performing time-division in which the number of time divisions is six.

Here, the irradiation unit 12 described above is an example of a transmissive irradiation unit. However, instead of the transmissive irradiation unit, the irradiation unit 12 may be a self-luminous irradiation unit. For example, the irradiation unit 12 may be a self-luminous irradiation device including light sources emitting light and provided at positions corresponding to the respective first subpixels arranged on the first display surface D1. In this case, the barrier pattern described above indicates the arrangement of barriers corresponding to areas emitting no light and slits corresponding to areas emitting light. That is, in this case, the control device 14 controls the first display unit 11 to periodically change the right and left image display arrangement among the right and left image display arrangements of a plurality of patterns that are different from each other, such that an image indicated by the left image data and an image indicated by the right image data are displayed on the first display surface D1 and controls the irradiation unit 12 to periodically change the barrier pattern among the barrier patterns of a plurality of patterns that are different from each other, the barrier pattern corresponding to the arrangement of the barriers including areas emitting no light and the slits including areas emitting light. That is, in the irradiation unit 12, each of the areas including the second subpixels transmitting light and the areas emitting light is an example of the area emitting light. In the irradiation unit 12, each of the areas including the second subpixels transmitting no light and the areas emitting no light is an example of the area emitting light.

As described above, the image display device 10 is the image display device 10 for displaying a stereoscopic image based on a parallax barrier scheme using time-division, the image display device including a plurality of display elements (in this example, the first subpixels) arranged in a matrix on an image display surface of a transmissive type (in this example, the first display surface D1), a plurality of illumination arrangement control elements (in this example, the second subpixels) arranged in a matrix on an illumination arrangement control surface (in this example, the second display surface D2) configured to variably control arrangement, on the image display surface, of illumination light emitted from a back surface of the image display surface to the image display surface, and a controller (in this case, the control device 14) configured to control the plurality of display elements based on left eye image data (in this example, the left image data) and right eye image data (in this example, the right image data) and control the plurality of illumination arrangement control elements based on an image displayed on the image display surface and a relative positional relationship between a position of the image display surface and a position of an observer (in this example, the observer H) observing the image display surface, wherein each of the plurality of illumination arrangement control elements on the illumination arrangement control surface is controlled by using a subpixel as a minimum control unit, and the controller is configured to control the plurality of display elements by changing, based on the number of divisions in the time-division (in this case, the number of time divisions), an arrangement pattern (in this example, the pattern of the right and left image display arrangement) for left image areas of the image display surface in which an image of the left eye image data is displayed and an arrangement pattern for right image areas of the image display surface in which an image of the right eye image data is displayed, respectively, control the plurality of illumination arrangement control elements by changing, in accordance with a change in the arrangement pattern (in this case, the pattern of the barrier pattern) on the image display surface, an arrangement pattern for barrier areas (in this case, the barriers) of the illumination arrangement control surface in which the illumination light is not generated and an arrangement pattern for slit areas (in this case, the slits) of the illumination arrangement control surface in which the illumination light is generated, respectively, and acquire distance information indicating a distance between at least one eye of the observer and the image display surface and corrects, based on the distance information acquired, a relative positional relationship between the slit areas and the image displayed on the image display surface, by using a width larger than 0 and smaller than a width of one subpixel as a minimum correction unit. Thus, the image display device 10 can suppress image interference between the left eye and the right eye, and as a result, the number of divisions in the time-division can be set to less than four, thus allowing the ratio between display luminance and power to be improved. The image display device 10 can prevent the brightness of the image displayed on the display surface of the first display unit from being lower than the desired brightness and prevent crosstalk from occurring.

Note that the image display device 10 described above may be configured to perform correction according to movement of viewpoint of the observer (change in the positions of the right eye and the left eye), for example, by using the image displayed on the first display surface D1 or by using both the first display surface D1 and the second display surface D2.

The embodiments of the present invention have been described in detail with reference to the drawings, but the specific configuration is not limited to the embodiments, and changes, substitutions, deletions, and the like may be made without departing from the gist of the present invention.

A program for implementing the functions of any of the components of the device described above (for example, the image display device 10 and the control device 14) may be recorded in a computer readable recording medium, and the program may be loaded into a computer system and executed. Note that the "computer system" as used herein includes hardware such as an Operating System (OS) and a peripheral device. The "computer readable recording medium" refers to a portable medium such as a flexible disk, a magneto-optical disk, a ROM, or a Compact Disk (CD)-ROM, and a storage device such as a hard disk built into a computer system. Furthermore, the "computer readable recording medium" includes a medium that holds a program for a certain period of time, such as a volatile memory (RAM) within a computer system serving as a server or a client in a case where the program is transmitted over a network such as the Internet or a communication channel such as a telephone line.

The program described above may be transmitted from a computer system that stores the program in a storage device or the like to another computer system via a transmission medium, or by transmission waves in the transmission medium. Here, the "transmission medium" for transmitting the program refers to a medium having a function of transmitting information, for example, a network (communication network) such as the Internet or a communication channel (communication line) such as a telephone line.

The program described above may be configured to implement some of the functions described above. Furthermore, the program described above may be a so-called differential file (differential program) that can implement the functions described above when combined with a program already recorded in a computer system.

REFERENCE SIGNS LIST

1 Image display system
10 Image display device
11 First display unit
12 Irradiation unit
13 Diffuser
14 Control device
20 Distance detection unit
121 Second display unit
122 Light source unit
140 Controller
141 Reading unit
142 Acquisition unit
143 Generation unit
144 Correction unit
145 Drive controller
150 Storage unit
D1 First display surface
D2 Second display surface
H Observer

The invention claimed is:

1. An image display device for displaying a stereoscopic image based on a parallax barrier scheme using time-division, the image display device comprising:
a plurality of display elements arranged in a matrix on an image display surface of a transmissive type;
a plurality of illumination arrangement control elements arranged in a matrix on an illumination arrangement control surface configured to variably control arrangement, on the image display surface, of illumination light emitted from a back surface of the image display surface to the image display surface; and
a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, wherein
each of the plurality of illumination arrangement control elements on the illumination arrangement control surface is controlled by using a subpixel as a minimum control unit, and
the controller is configured to:
control an arrangement pattern for left image areas of the image display surface in which an image of the left eye image data is displayed and an arrangement pattern for right image areas of the image display surface in which an image of the right eye image data is displayed, respectively,
control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and
acquire positional information indicating a distance, in a direction orthogonal to the image display surface, between at least one eye of the observer and the image display surface and corrects, based on the distance indicated by the positional information acquired, a relative positional relationship between the slit areas and the image displayed on the image display surface, by translating the slit areas in the direction orthogonal to the longitudinal direction of the subpixel using a width larger than 0 and smaller than a width of one subpixel as a minimum correction unit.

2. The image display device according to claim 1, wherein the number of divisions in the time-division is smaller than four.

3. The image display device according to claim 1, wherein the slit areas have inclination angle of larger than 0 and smaller than tan−1 (⅓) with respect to an upward/downward direction along the illumination arrangement control surface.

4. The image display device according to claim 1, wherein each of the plurality of display elements includes a red subpixel, a green subpixel, and a blue subpixel,
each of the plurality of illumination arrangement control elements includes a red subpixel, a green subpixel, and a blue subpixel, and
the plurality of display elements on the image display surface and the plurality of illumination arrangement control elements on the illumination arrangement control surface are arranged such that a sequence of the red subpixel, the green subpixel, and the blue subpixel on the image display surface is the reverse of a sequence of the red subpixel, the green subpixel, and the blue subpixel on the illumination arrangement control surface.

5. The image display device according to claim 1, wherein information indicating brightness of ambient light is acquired, and the number of divisions in the time-division is changed in accordance with the brightness indicated by the acquired information.

6. An image display method for an image display device for displaying a stereoscopic image based on a parallax barrier scheme using time-division, the image display device including a plurality of display elements arranged in a matrix on an image display surface of a transmissive type, a plurality of illumination arrangement control elements arranged in a matrix on an illumination arrangement control surface configured to variably control arrangement, on the image display surface, of illumination light emitted from a back surface of the image display surface to the image display surface, and a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, each of the plurality of illumination arrangement control elements on the illumination arrangement control surface being controlled by using a subpixel as a minimum control unit, the image display method comprising:

controlling an arrangement pattern for left image areas of the image display surface in which an image of the left eye image data is displayed and an arrangement pattern for right image areas of the image display surface in which an image of the right eye image data is displayed, respectively;

controlling the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively; and acquiring positional information indicating a distance, in a direction orthogonal to the image display surface, between at least one eye of the observer and the image display surface and correcting, based on the distance indicated by the positional information acquired, a relative positional relationship between the slit areas and the image displayed on the image display surface, by translating the slit areas in the direction orthogonal to the longitudinal direction of the subpixel using a width larger than 0 and smaller than a width of one subpixel as a minimum correction unit.

7. An image display system comprising: an image display device configured to display a stereoscopic image based on a parallax barrier scheme using time-division; and a distance detection unit, wherein the image display device includes:
a plurality of display elements arranged in a matrix on an image display surface of a transmissive type;
a plurality of illumination arrangement control elements arranged in a matrix on an illumination arrangement control surface configured to variably control arrangement, on the image display surface, of illumination light emitted from a back surface of the image display surface to the image display surface; and
a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, wherein
each of the plurality of illumination arrangement control elements on the illumination arrangement control surface is controlled by using a subpixel as a minimum control unit,
the distance detection unit detects distance information indicating a distance, in a direction orthogonal to the image display surface, between at least one eye of the observer and the image display surface, and
the controller is configured to:
control an arrangement pattern for left image areas of the image display surface in which an image of the left eye image data is displayed and an arrangement pattern for right image areas of the image display surface in which an image of the right eye image data is displayed, respectively, control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and acquire positional information indicating the distance and corrects, based on the distance indicated by the positional information acquired, a relative positional relationship between the slit areas and the image displayed on the image display surface, by translating the slit areas in the direction orthogonal to the longitudinal direction of the subpixel using a width larger than 0 and smaller than a width of one subpixel as a minimum correction unit.

8. An image display device for displaying a stereoscopic image based on a parallax barrier scheme using time-division, the image display device comprising:

a plurality of display elements arranged in a matrix on an image display surface of a transmissive type;
a plurality of illumination arrangement control elements arranged in a matrix on an illumination arrangement control surface configured to variably control arrangement, on the image display surface, of illumination light emitted from a back surface of the image display surface to the image display surface; and
a controller configured to control the plurality of display elements based on left eye image data and right eye image data and control the plurality of illumination arrangement control elements based on an image displayed on the image display surface and a relative positional relationship between a position of the image display surface and a position of an observer observing the image display surface, wherein
each of the plurality of display elements on the image display surface is controlled by using a subpixel as a minimum control unit, and
the controller is configured to:
control an arrangement pattern for left image areas of the image display surface in which an image of the left eye image data is displayed and an arrangement pattern for right image areas of the image display surface in which an image of the right eye image data is displayed, respectively,
control the plurality of illumination arrangement control elements by changing, in accordance with a change in the arrangement pattern on the image display surface, an arrangement pattern for barrier areas of the illumination arrangement control surface in which the illumination light is not generated and an arrangement pattern for slit areas of the illumination arrangement control surface in which the illumination light is generated, respectively, and
acquire positional information indicating a distance, in a direction orthogonal to the image display surface, between at least one eye of the observer and the image display surface, and corrects, based on the distance indicated by the positional information acquired, positions of the slit areas in a case where the image display surface is viewed by the observer, by translating the slit areas in the direction orthogonal to the longitudinal direction of the subpixel using a width larger than 0 and smaller than a width of one subpixel as a minimum correction unit.

* * * * *